United States Patent
Wentink et al.

(10) Patent No.: US 8,897,209 B2
(45) Date of Patent: Nov. 25, 2014

(54) SYSTEMS AND METHODS FOR PARALLEL COMMUNICATION WITH LEGACY WLAN RECEIVERS

(75) Inventors: Maarten Menzo Wentink, Naarden (NL); Didier Johannes Richard van Nee, De Meern (NL); Vincent K. Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1024 days.

(21) Appl. No.: 12/501,059

(22) Filed: Jul. 10, 2009

(65) Prior Publication Data

US 2010/0014448 A1      Jan. 21, 2010

Related U.S. Application Data

(60) Provisional application No. 61/080,998, filed on Jul. 15, 2008.

(51) Int. Cl.
*H04B 7/212* (2006.01)
*H04L 1/16* (2006.01)

(52) U.S. Cl.
CPC ............ *H04L 1/1614* (2013.01); *H04L 1/1685* (2013.01)
USPC ............................. 370/322; 370/236; 370/346

(58) Field of Classification Search
USPC .......................................... 370/236, 322, 346
See application file for complete search history.

(56) References Cited

U.S. PATENT DOCUMENTS

| 7,675,911 B2* | 3/2010 | Singh et al. .................... 370/389 |
| 2003/0045044 A1 | 3/2003 | Dentry et al. |
| 2005/0152394 A1 | 7/2005 | Cho |
| 2006/0034274 A1* | 2/2006 | Kakani et al. ................. 370/389 |
| 2006/0140172 A1 | 6/2006 | Trainin |
| 2006/0248429 A1* | 11/2006 | Grandhi et al. ............... 714/749 |
| 2007/0110055 A1 | 5/2007 | Fischer et al. |

(Continued)

FOREIGN PATENT DOCUMENTS

| CN | 1722723 A | 1/2006 |
| JP | 2005102136 A | 4/2005 |

(Continued)

OTHER PUBLICATIONS

IEEE P802.11n/D4.00: "Draft Standard for Information Technology Telecommunications and information exchange between systems. Local and metropolitan area networks. Specific requirements. Part 11: Wireless LAN Medium Access Control (MAC) and Physical Layer (PHY) specifications Amendment 4:Enhancements for Higher Throughput" Mar. 1, 2008, pp. 151-158, pp. 293-295, XP002558358 Retrieved from the Internet: URL:http://i eeexplore.i eee.org/servlet/opa c?punumber=4497169> Section 20.3.11.10.1, Spatial mapping; p. 294 section 9.16.1.1, PSMP frame transmission (PSMP-DTT and PSMP-UTT).

(Continued)

*Primary Examiner* — Mark Rinehart
*Assistant Examiner* — Matthew Hopkins
(74) *Attorney, Agent, or Firm* — Eric Ho

(57) ABSTRACT

A method for parallel communication with wireless local area network (WLAN) receivers is described. A parallel transmission is started. A first MAC protocol data unit (MPDU) is sent to a first WLAN receiver. An acknowledgment (ACK) request is sent to the first WLAN receiver. An ACK is received from the first WLAN receiver.

31 Claims, 20 Drawing Sheets

(56) References Cited

U.S. PATENT DOCUMENTS

| | | | |
|---|---|---|---|
| 2007/0189207 A1* | 8/2007 | Sammour et al. | 370/328 |
| 2007/0274246 A1* | 11/2007 | Stephens | 370/312 |
| 2008/0002636 A1 | 1/2008 | Gaur et al. | |

FOREIGN PATENT DOCUMENTS

| | | |
|---|---|---|
| JP | 2007037196 A | 2/2007 |
| JP | 2007502079 A | 2/2007 |
| JP | 2007214920 A | 8/2007 |
| JP | 2007329694 A | 12/2007 |
| JP | 2008011509 A | 1/2008 |
| WO | 2005060198 A1 | 6/2005 |
| WO | 2005067214 A1 | 7/2005 |

OTHER PUBLICATIONS

"IEEE Standard for Information technology—Telecommunications and information exchange between systems—Local and metropolitan area networks—Specific requirements-Part 11: Wireless LAN Medium Access Control (MAC) and Physical Layer (PHY) Specifications; IEEE Std 802.11-2007 (Revision of IEEE Std 802.11-1999)." Jun. 12, 2007, IEEE Standard; [IEEE Standard], IEEE, Piscataway, NJ, USA, pp. 1-1184, XP017601788 ISBN: 9780738156569 Section 9.2.7, Broadcast and multicast MPDU transfer procedure Section 9.11, No Acknowledgement (No Ack) section 17. Orthogonal frequency division multiplexing (OFDM) PHY specification for the 5 GHz band table 7.6.

International Search Report & Written Opinion—PCT/US2009/050398, International Search Authority—European Patent Office—Dec. 14, 2009.

Joshua Wall et al: "Adaptive Multimedia Packet Transmission for Broadband IEEE 802.11 Wireless Lans" Personal, Indoor and Mobile Radio Communications, 2006 IEEE 17th Inter National Symposium on, IEEE, PI, Sep. 1, 2006, pp. 1-5, XP031023437 ISBN: 978-1-4244-0329-5 the whole document.

Mjeku M et al: "Use of Different Acknowledgement Policies for Burst Transmission in Fiber-fed Wireless LANs" IEEE Communications Letters, IEEE Service Center, Piscataway, NJ, US, vol. 11, No. 7, Jul. 1, 2007, pp. 601-603, XP011187560 ISSN: 1089-7798 the whole document.

Kuzminskiy A M.,"Downlink Throughput Enhancement of IEEE 802.11A/G Using SDMA With a Multi-Antenna Access Point",Signal Processing,NL,Elsevier Science Publishers B.V., P1896-1910,Aug. 1, 2006.

Taiwan Search Report—TW098123793—TIPO—Oct. 1, 2012.

Kowalski J.M., et al., "Proposal for 802.11n", IEEE 802.11-04/938r0, IEEE mentor, pp. 1-71, Aug. 13, 2004.

Stephens A., "802.11 TGn LB115 Submission", IEEE 802.11-08/0040r1, IEEE mentor, pp. 1-10, Jan. 10, 2008

Stephens A., "802.11 TGn LB97 Submission to resolve CID 922", IEEE802.11-07/2410r0, IEEE mentor, pp. 1-13, Sep. 12, 2007.

Stephens A., "Joint Proposal: High throughput extension to the 802.11 Standard: MAC", IEEE802.11-05/1095r3, IEEE mentor, pp. 1-55, Jan. 9, 2006.

* cited by examiner

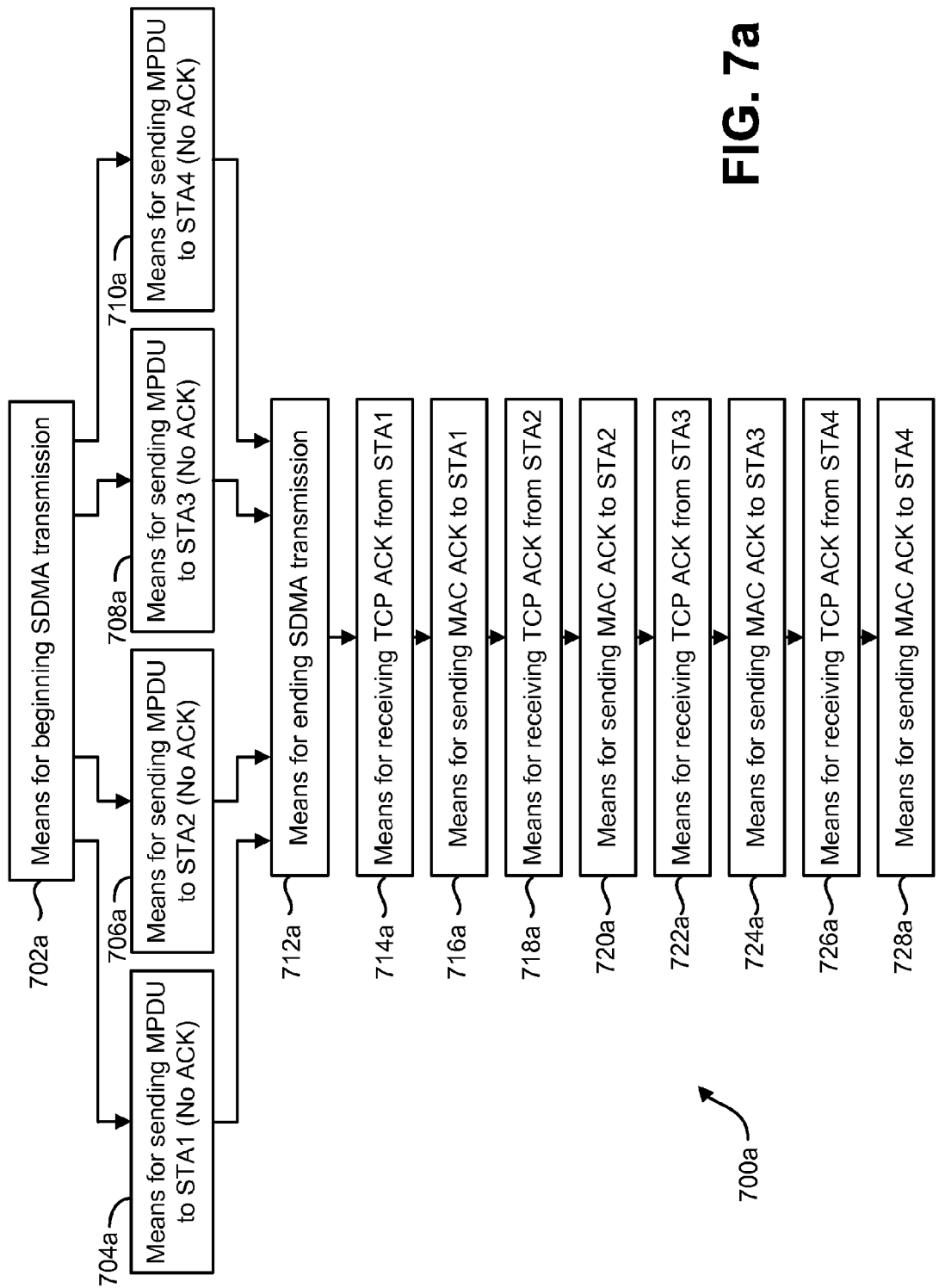

SYSTEMS AND METHODS FOR PARALLEL COMMUNICATION WITH LEGACY WLAN RECEIVERS

RELATED APPLICATIONS

This application claims the benefit of U.S. Provisional Patent Application Ser. No. 61/080,998, entitled "Systems and Methods for SDMA Communication with Legacy WLAN Receivers," which was filed Jul. 15, 2008.

TECHNICAL FIELD

The present disclosure relates generally to wireless communication systems. More specifically, the present disclosure relates to systems and methods for parallel communication with legacy wireless local area network (WLAN) receivers.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "subscriber station" will be used herein.

A wireless communication system may provide communication for a number of cells, each of which may be serviced by a base station. A base station may be a fixed station that communicates with mobile stations. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA) systems.

The IEEE 802.11 group is currently looking into standardizing a new and faster version of 802.11, under the name VHT (Very High Throughput). Technologies are being considered in this group that allow for multiple transmissions to occur in parallel without causing a collision, like SDMA and OFDMA. There exists a need for using these new technologies to communicate with legacy 802.11 clients.

BRIEF DESCRIPTION OF THE DRAWINGS

FIG. 7a illustrates means-plus-function blocks corresponding to the method of FIG. 7;

DETAILED DESCRIPTION

Figure 1:
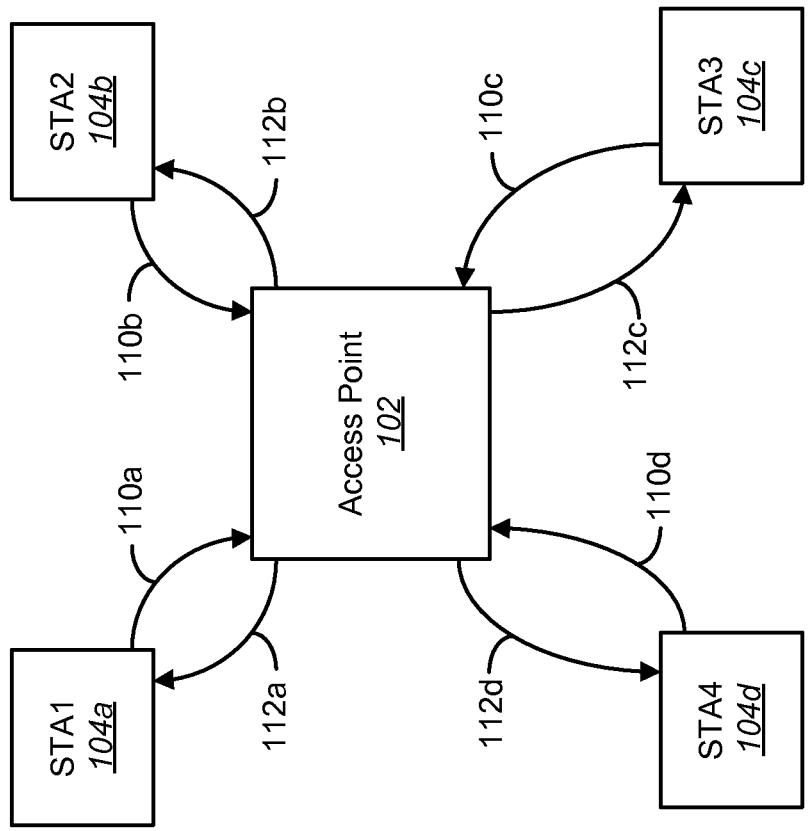
FIG. 1 illustrates a system including an access point in wireless electronic communication with multiple subscriber stations.

A method for parallel communication with legacy wireless local area network (WLAN) receivers is described. The method may be implemented by a wireless device. A parallel transmission may begin. A first medium access control (MAC) protocol data unit (MPDU) may be sent to a first WLAN receiver. The MPDU instructions to a first WLAN receiver may include the absence of an immediate response.

The parallel communication may use spatial division multiple access (SDMA). The parallel communication may also use orthogonal frequency division multiple access (OFDMA). The method may be implemented in a wireless communication system that supports an Institute of Electronic and Electrical Engineers (IEEE) 802.11 standard.

Instructions in the MPDU for the first WLAN receiver may include a Block ACK method. An acknowledgment (ACK) request may be sent to the first WLAN receiver. An ACK may be received from the first WLAN receiver.

Instructions in the MPDU for the first WLAN receiver may include a No ACK method. Instructions in the MPDU for the first WLAN receiver may also include a Broadcast Receiver Address (RA) policy. Instructions in the MPDU for the first WLAN receiver may further include a Power Save Multi-Poll (PSMP) policy.

The ACK request sent to the first WLAN receiver may be a Block Acknowledgment Request. The ACK received from the first WLAN receiver may be a block ACK. The ACK received from the first WLAN receiver may also be a transmission control protocol (TCP) ACK. A MAC ACK may be sent upon receiving the TCP ACK from the first WLAN receiver.

A wireless device that is configured for parallel communication with legacy wireless local area network (WLAN) receivers is also described. The wireless device may include a processor. The wireless device may also include circuitry coupled to said processor. The circuitry may be configured to begin a parallel transmission. The circuitry may also be configured to send a first medium access control (MAC) protocol data unit (MPDU) to a first WLAN receiver. The circuitry may further be configured to include in the MPDU instructions to a first WLAN receiver that comprise the absence of an immediate response.

An apparatus that is configured for spatial division multiple access (SDMA) communication with legacy wireless local area network (WLAN) receivers is also described. The apparatus may include means for beginning an SDMA transmission. The apparatus may also include means for sending a first medium access control (MAC) protocol data unit (MPDU) to a first WLAN receiver. The apparatus may further include means for sending an acknowledgment (ACK) request to the first WLAN receiver. The apparatus may also include means for receiving an ACK from the first WLAN receiver.

A computer-program product for spatial division multiple access (SDMA) communication with legacy wireless local area network (WLAN) receivers is also described. The computer-program product may include a computer-readable medium having instructions thereon. The instructions may include code for beginning an SDMA transmission. The instructions may also include code for sending a first medium access control (MAC) protocol data unit (MPDU) to a first WLAN receiver. The instructions may further include code for sending an acknowledgment (ACK) request to the first WLAN receiver. The instructions may also include code for receiving an ACK from the first WLAN receiver.

A method for parallel communication with legacy wireless local area network (WLAN) receivers is described. A Power Save Multi-Poll (PSMP) frame indicating a Power Save Multi-Poll Downlink Transmission Time (PSMP-DTT) and a Power Save Multi-Poll Uplink Transmission Time (PSMP-UTT) may be sent. A parallel transmission may begin during the PSMP-DTT. A first MAC protocol data unit (MPDU) may be sent to a first WLAN receiver indicating a PSMP acknowledgement (ACK) policy. A Multicast Traffic Identifier Block ACK (MTBA) frame may be received from the first receiver during the PSMP-UTT.

The Institute of Electronic and Electrical Engineers (IEEE) 802.11 Working Group aims to prepare formal standards for wireless local area network (WLAN) computer communication in the 2.4 GHz and 5 GHz public spectrum bands.

FIG. 1 illustrates a system 100 including an access point 102 in wireless electronic communication with multiple subscriber stations 104. The access point 102 may be a base station. The subscriber stations 104 may be mobile stations such as mobile phones and wireless networking cards. Some or all of the subscriber stations 104 may be 802.11 devices such as 802.11a receivers, 802.11b receivers, 802.11g receivers, 802.11n receivers, etc.

The access point 102 may communicate electronically with each of the subscriber stations 104. For example, the access point 102 may send electronic communications to the subscriber stations 104 over a downlink transmission 112. Similarly, the subscriber stations 104 may send electronic communications to the access point 102 over an uplink transmission 110. The subscriber stations 104 may receive transmissions from the access point 102 that are not directed at the specific subscriber station 104. For example, the access point 102 may send a downlink transmission 110 to STA1 104a that may also be received by STA2 104b. Similarly, subscriber stations 104 may receive uplink transmissions 110 from other subscriber stations 104 that are not directed at the other subscriber stations 104. For example, STA2 104b may send an uplink transmission 110 to the access point 102 that may also be received by STA3 104c.

Multiple subscriber stations 104 may be in electronic communication with a single access point 102 at any given time. As such, the access point 102 may be designed to send transmissions to more than one subscriber station 104 during the same time frame. Such communications may be referred to as parallel transmissions in the downlink direction 112. Although SDMA technology is mentioned in the present discussion, it is assumed that the term covers other, similar technologies as well.

The access point 102 may use SDMA in the downlink direction to transmit to multiple subscriber stations 104 in parallel. A medium access control (MAC) layer may process data as MAC protocol data units (MPDUs). An MPDU may be aggregated into an A-MPDU. In an A-MPDU, the multiple MPDU frames may be combined into a single PHY Protocol Data Unit (PPDU), thereby allowing the frames to be sent as a group. An A-MPDU requires that all the frames be addressed to the same single subscriber station 104. The access point 102 may then transmit the MPDUs to the subscriber stations 104. Although only one access point 102 and four subscriber stations 104 are shown, the present systems and methods may be applicable to systems 100 that include more than one access point 102 and more than or fewer than four subscriber stations 104.

An ACK policy may be indicated in the quality of service (QoS) control (QC) field of the MAC header. The bits in the MAC header may instruct the subscriber stations 104 on how to respond to received PPDUs. Specifically, the ACK policy may instruct the subscriber stations 104 to avoid sending an ACK immediately after receiving a PPDU. Bit 5 and bit 6 of the QC field of the MAC header may define the response of the subscriber station 104. Bit 5 and bit 6 of the QC field of the MAC header may be referred to as the ACK Policy Subfield of the QoS Control Field of QoS Data frames. SDMA may be used to transmit PPDUs to multiple receivers at once.

If QC bit 5 is set to 0 and QC bit 6 is set to 0 in the ACK Policy Subfield, then the subscriber station 104 may be sending an ACK or a Block ACK to the access point 102 after a short inter frame space (SIFS). This ACK Policy may be referred to as Normal ACK or Implicit Block ACK Request (BAR).

For a non aggregated MPDU, the addressed recipient may return an ACK or a QoS+CF-ACK frame (Quality of Service Contention Free Acknowledgment frame) after a SIFS period.

For an MPDU that is part of an A-MPDU, the addressed recipient may return a Block ACK MPDU. The Block ACK MPDU may be returned individually or as part of an A-MPDU starting a SIFS after the PPDU carrying the frame.

If QC bit 5 is set to 1 and QC bit 6 is set to 0 in the ACK Policy Subfield, the access point 102 may be sending a No Ack. In this case, the addressed recipient may take no action upon receipt of the frame. The ACK Policy Subfield may be set to this value in all directed frames in which the sender does not require Acknowledgment at the MAC level. This ACK Policy Subfield setting may also be used for group addressed frames that use the QoS frame format. This ACK Policy Subfield setting may not be used for QoS data frames with a Traffic Identifier (TID) for which a Block ACK agreement exists. The No ACK policy is implied for group addressed frames.

If QC bit 5 is set to 0 and QC bit 6 is set to 1 in the ACK Policy Subfield, the access point 102 may be sending a no-explicit-Acknowledgment. The access point 102 may also be sending a Power Save Multi-Poll (PSMP) Ack. When bit 6 of the ACK Policy Subfield is set to 1, there may be a response to the frame that is received. However, the response may be neither the ACK nor any data frame of subtype+CF-ACK (Contention Free Acknowledgment), nor any other PPDU transmitted after a SIFS period.

When QC bit 5 is set to 0 and QC bit 6 is set to 1, the acknowledgment for a frame indicating PSMP ACK when it appears in a Power Save Multi-Poll Downlink Transmission Time (PSMP-DTT) is to be received in a later Power Save Multi-Poll Uplink Transmission Time (PSMP-UTT).

If QC bit 5 is set to 1 and QC bit 6 is set to 1 in the ACK Policy Subfield, access point 102 may be signaling a Block ACK method of response. The addressed recipient may take no action upon the receipt of the frame except for recording the method of response. The recipient may expect a BAR frame in the future. Upon receiving the BAR frame, the recipient may then respond with a Block ACK (BA).

Figure 2:
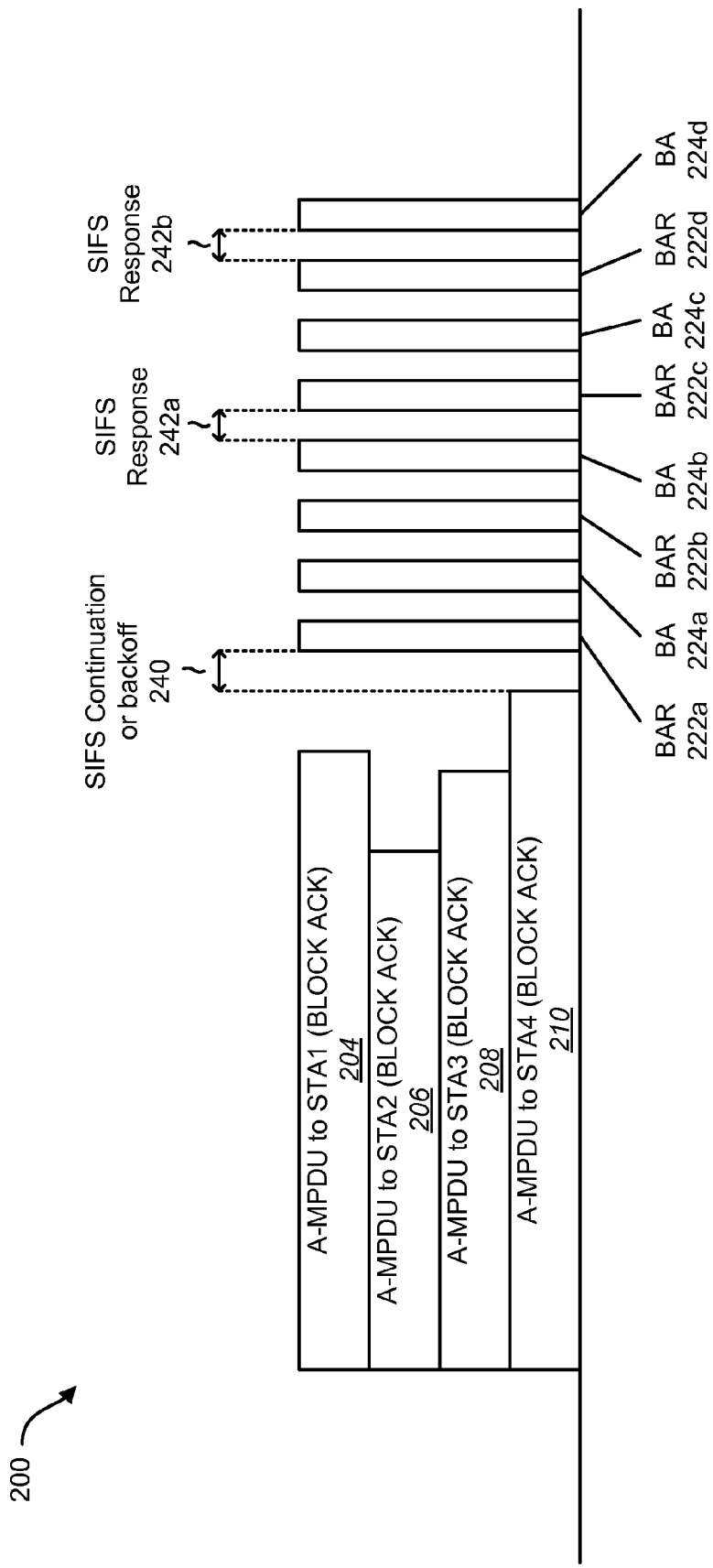
FIG. 2 illustrates a system for SDMA transmission to multiple legacy 802.11n receivers using a Block ACK Request (BAR) method of response.

FIG. 2 illustrates a system 200 for SDMA transmission to multiple legacy 802.11n receivers using a Block ACK Request (BAR) method of response. The access point 102 may transmit a MAC protocol data unit (MPDU or A-MPDU) to the 802.11n receivers. To prevent the situation where the legacy 802.11 receivers transmit an ACK frame a SIFS after the transmission ends, the downlink MPDUs may be transmitted using a Block ACK policy. The Block ACK policy may instruct the subscriber stations 104 to take no action except for recording the method of response in response to receiving an SDMA transmission. Because the Block ACK Ack Policy is mandatory for 802.11n equipment, this method may be backward compatible with existing 802.11n equipment that is out in the field. Existing 802.11n equipment that is out in the field may be referred to as legacy 802.11n equipment. If the legacy 802.11n receivers transmit an ACK frame a SIFS after the transmission ends (because the ACK Policy was set to Normal ACK or Implicit Block ACK Request), the longer frames in the SDMA transmission may be disturbed. Additionally, the ACK frame may collide with the ACK frames of other 802.11n receivers.

Each of the MPDUs may include instructions in the QC field of the MAC header for a method of acknowledgment by the receiver of the MPDU. For example, the access point 102 may transmit an A-MDPU 204 to STA1 104*a* that includes instructions for STA1 104*a* to employ the Block ACK method. The access point 102 may transmit an A-MPDU 206 to STA2 104*b* that includes instructions for STA2 104*b* to employ the Block ACK method. The access point 102 may transmit an A-MPDU 208 to STA3 104*c* that includes instructions for STA3 104*c* to employ the Block ACK method. The access point 102 may also transmit an A-MPDU 210 to STA4 104*d* that includes instructions for STA4 104*d* to employ the Block ACK method.

The Block ACK method implies that the receiving subscriber station 104 maintain a record of received frames. However, the receiving subscriber station 104 may not transmit a BA 224 immediately after the downlink frame ends. Instead, the transmission of the BA 224 frames is subsequently invited by the access point 102 by sequentially transmitting a BAR 222 to each legacy subscriber station 104. A prior Block ACK agreement must be present for the MPDUs carrying the Block ACK policy. The first BAR 222*a* may be transmitted a SIFS continuation 240 after the end of the longest SDMA transmission 210 (because the SDMA transmissions may take varying amounts of time, and thus may not end at the same time). The first BAR 222*a* may also be transmitted once a backoff has occurred after the longest SDMA transmission. The subscriber station 104 may wait a SIFS Response 242*a* before sending a BA 224 to the access point 102. Upon receiving the BA 224, the access point 102 may wait a SIFS Response 242*b* or a backoff before sending a BAR 222 to the next subscriber station 104. The BARs 222 and subsequent BAs 224 may be referred to as a BAR/BA train. The BAR/BA train may be transmitted as a SIFS burst.

Figure 3:
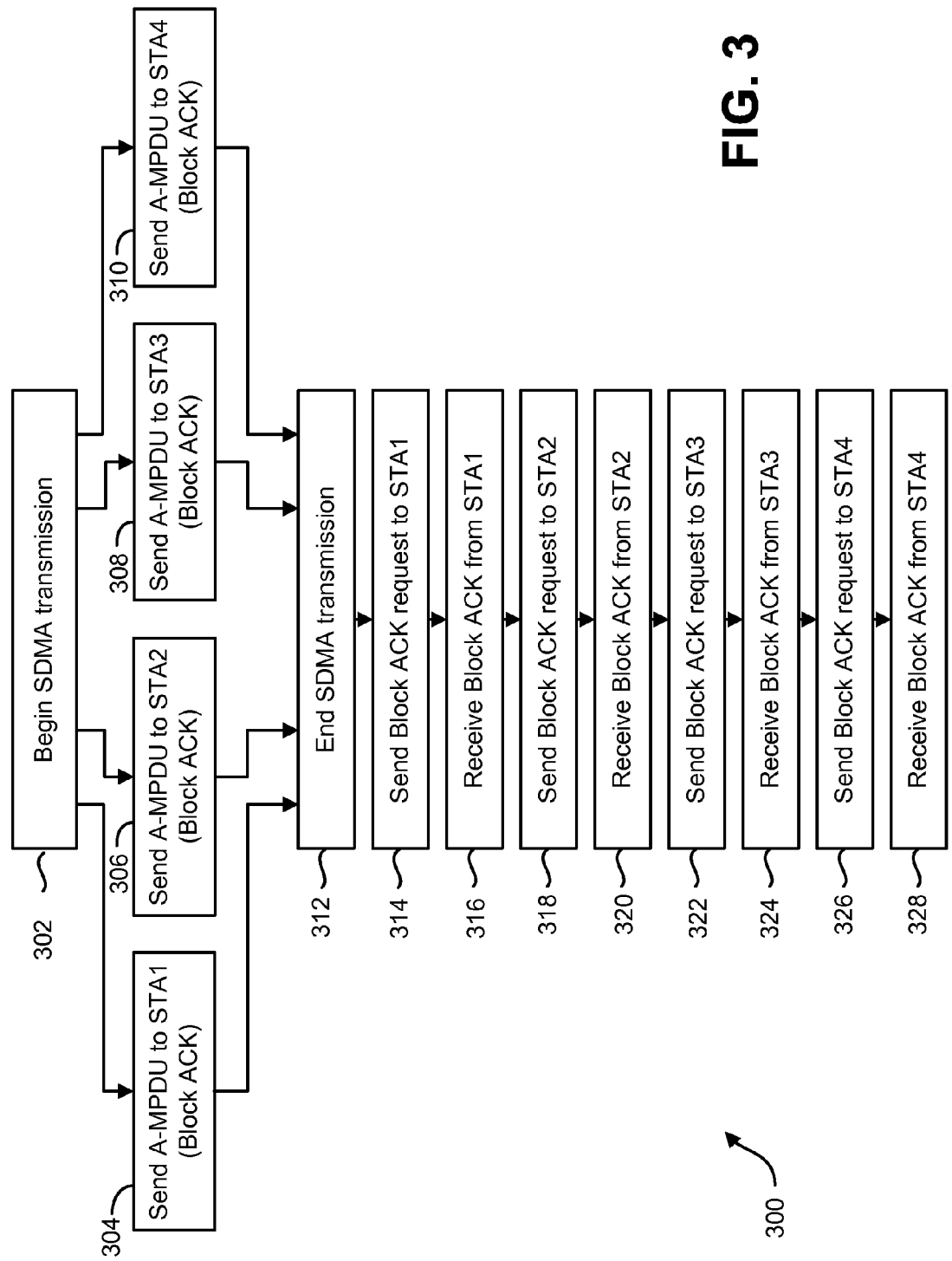
FIG. 3 is a flow diagram illustrating a method for SDMA transmission to multiple legacy 802.11n receivers using a BAR method of response.

FIG. 3 is a flow diagram illustrating a method 300 for SDMA transmission to multiple legacy 802.11n receivers using a BAR method of response. The access point 102 may begin 302 SDMA transmission. The SDMA transmission may indicate an ACK response method to the receiving subscriber stations 104. The access point 102 may send transmissions to the subscriber stations 104 in parallel. For example, the access point 102 may send 304 an A-MPDU to STA1 104*a*, send 306 an A-MPDU to STA2 104*b*, send 308 an A-MPDU to STA3 104*c*, and send 310 an A-MPDU to STA4 104*d*. Once the longest SDMA transmission has completed, the access point 102 may end 312 the SDMA transmission. The access point 102 may then send 314 a Block ACK request to STA1 104*a*. The access point 102 may then receive 316 a Block ACK from STA1 104*a*. The access point 102 may next send 318 a Block ACK request to STA2 104*b* and then receive 320 a Block ACK from STA2 104*b*. The access point 102 may then send 322 a Block ACK request to STA3 104*c* and receive 324 a Block ACK from STA3 104*c*. Finally, the access point 104 may send 326 a Block ACK request to STA4 104*d* and then receive 328 a Block ACK from STA4 104*d*.

Figure 3A:
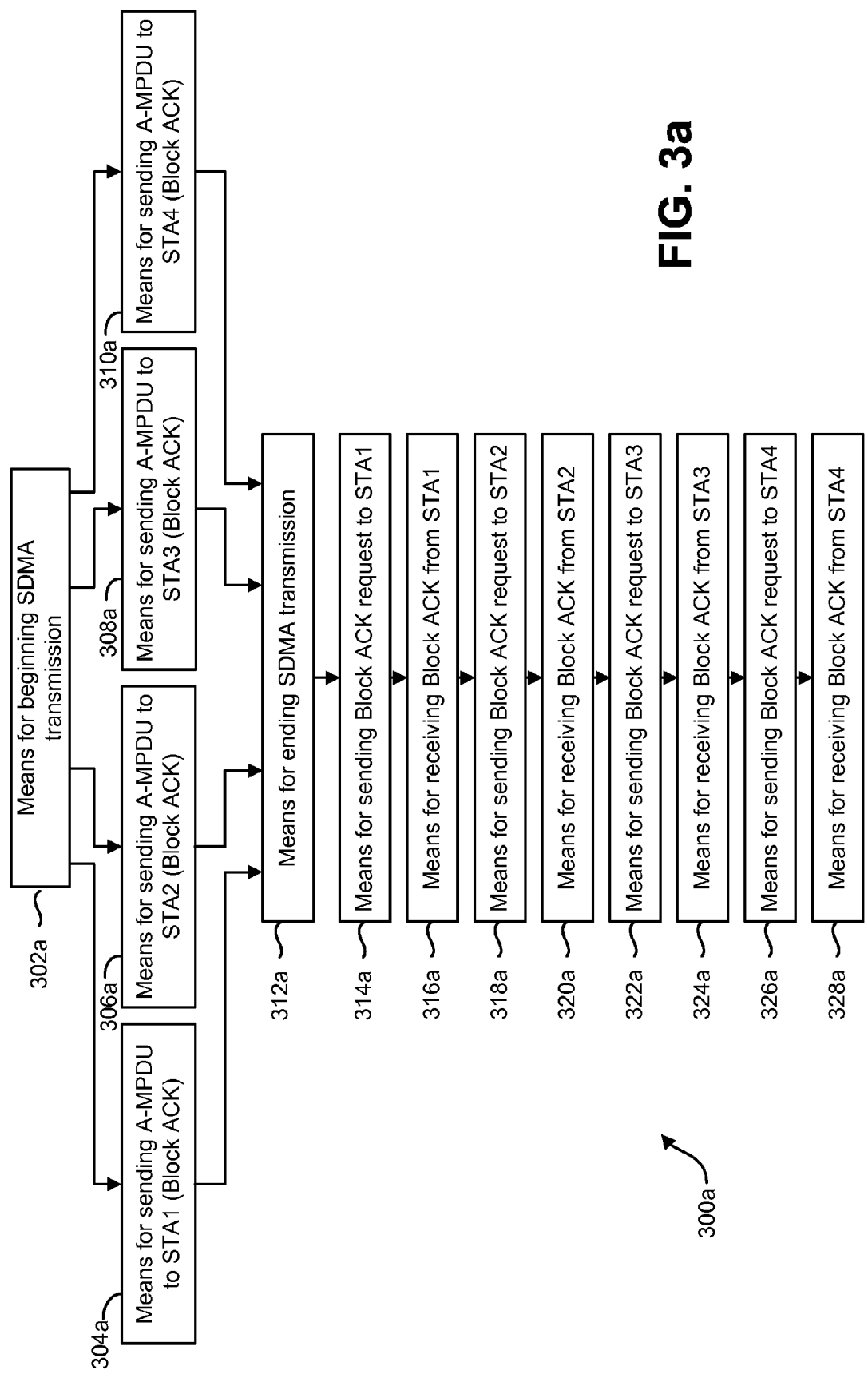
FIG. 3a illustrates means-plus-function blocks corresponding to the method of FIG. 3.

The method 300 of FIG. 3 described above may be performed by various hardware and/or software component(s) and/or module(s) corresponding to the means-plus-function blocks 300*a* illustrated in FIG. 3*a*. In other words, blocks 302 through 328 illustrated in FIG. 3 correspond to means-plus-function blocks 302*a* through 328*a* illustrated in FIG. 3*a*.

Figure 4:
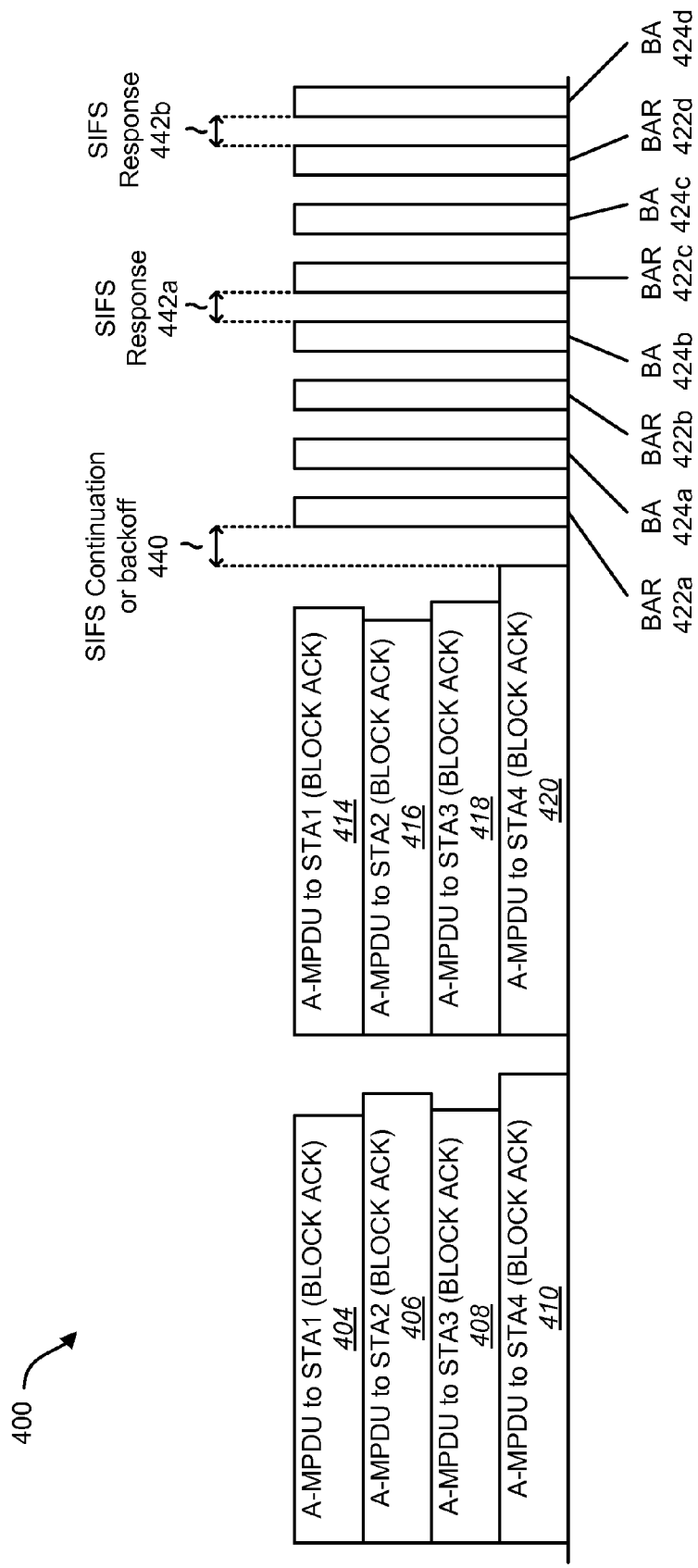
FIG. 4 illustrates a system for multiple sequential SDMA transmissions to multiple legacy 802.11n receivers using a BAR method of response.

FIG. 4 illustrates a system 400 for multiple sequential SDMA transmissions to multiple legacy 802.11n receivers using a BAR method of response. The access point 102 may transmit multiple sequential MPDUs to the 802.11n receivers. To prevent the situation where the legacy 802.11 receivers transmit an ACK frame a SIFS after the transmission ends, the downlink MPDUs may be transmitted using a Block ACK policy. Thus, the access point 102 may transmit multiple sequential MPDUs without expecting or receiving acknowledgment from the 802.11 receivers.

The access point 102 may transmit an A-MDPU 404 to STA1 104*a* that includes instructions for STA1 104*a* to employ the Block ACK method. The access point 102 may transmit an A-MPDU 406 to STA2 104*b* that includes instructions for STA2 104*b* to employ the Block ACK method. The access point 102 may transmit an A-MPDU 408 to STA3 104c that includes instructions for STA3 104c to employ the Block ACK method. The access point 102 may also transmit an A-MPDU 410 to STA4 104d that includes instructions for STA4 104d to employ the Block ACK method.

The access point 102 may then transmit an A-MDPU 414 to STA1 104a, an A-MPDU 416 to STA2 104b, an A-MPDU 418 to STA3 104c, and an A-MPDU 420 to STA4 104d. The MPDUs may include instructions for the subscriber stations 104 to employ the Block ACK method.

The transmission of the Block ACK frames may be subsequently invited by the access point 102 by sequentially transmitting a BAR 422 to each legacy station. A prior Block ACK agreement is present for the MPDUs carrying the Block ACK policy. A second set of MPDUs may be transmitted a SIFS continuation 440 after the end of the longest SDMA transmission of the first set of MPDUs. A first BAR 422a may be transmitted a SIFS continuation 440 after the end of the longest SDMA transmission of the second set of MPDUs. The first BAR 422a may also be transmitted once a backoff has occurred after the longest SDMA transmission of the second set of MPDUs. The subscriber station 104a may wait a SIFS Response 442 before sending a BA 424a to the access point 102. Upon receiving the BA 424a, the access point 102 may wait a SIFS Response 442 before sending a BAR 422 to the next subscriber station 104. The BARs 422 and subsequent BAs 424 may be referred to as a BAR/BA train. The BAR/BA train may be transmitted as a SIFS burst.

Figure 5:
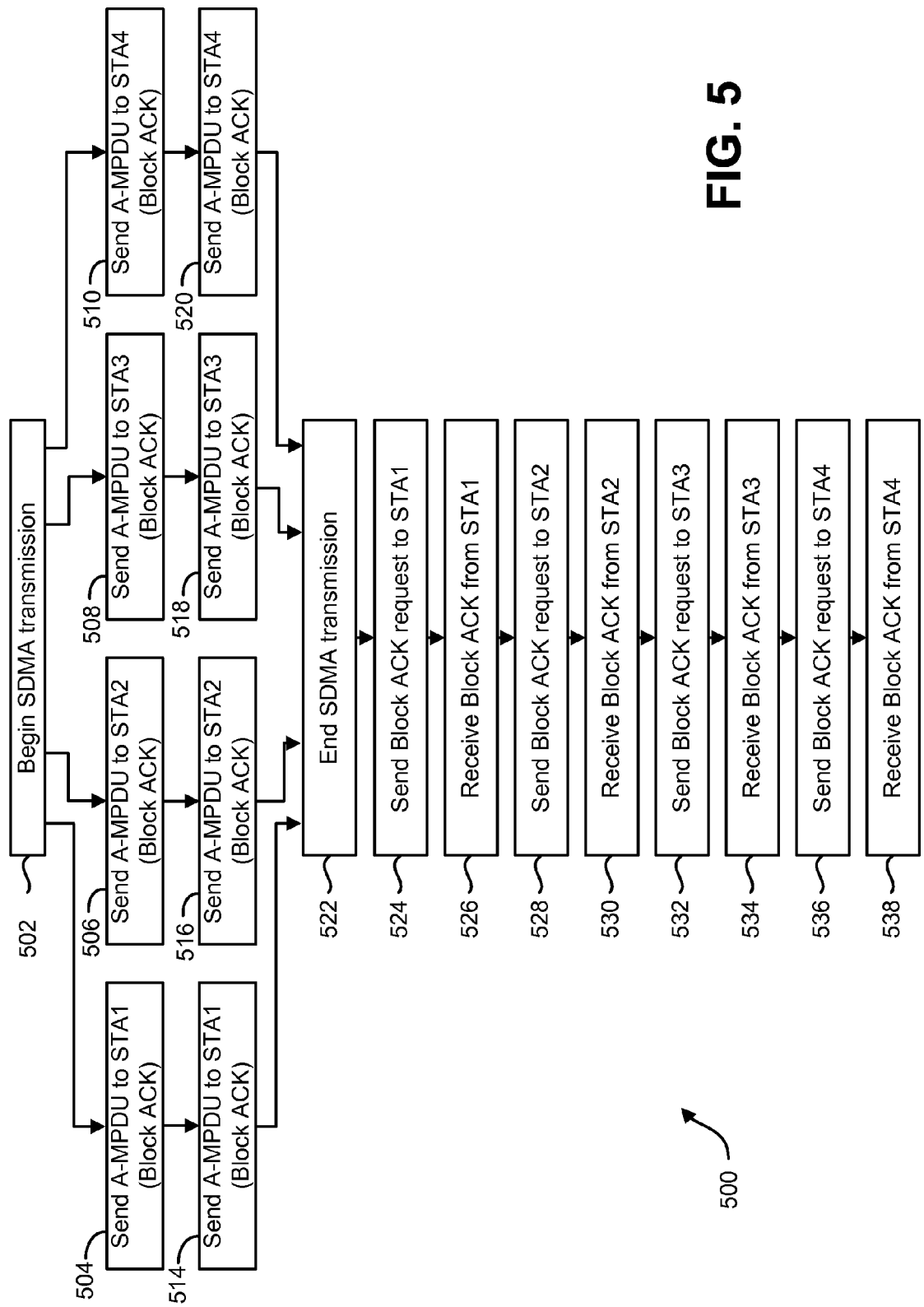
FIG. 5 is a flow diagram illustrating a method for multiple sequential SDMA transmissions to multiple legacy 802.11n receivers using a BAR method of response.

FIG. 5 is a flow diagram illustrating a method 500 for multiple sequential SDMA transmissions to multiple legacy 802.11n receivers using a BAR method of response. The access point 102 may begin SDMA transmission. The SDMA transmission may indicate an ACK response method to the receiving subscriber stations 104. The access point 102 may send a first set of transmissions to the subscriber stations 104 in parallel. For example, the access point 102 may send 504 an A-MPDU to STA1 104a, send 506 an A-MPDU to STA2 104b, send 508 an A-MPDU to STA3 104c, and send 510 an A-MPDU to STA4 104d. The A-MPDUs may indicate a Block ACK response method to the receiving subscriber stations 104.

Once the longest SDMA transmission of the first set of transmissions has completed, the access point 102 may send a second set of transmissions to the subscriber stations 104 in parallel. For example, the access point 102 may send 514 an A-MPDU to STA1 104a, send 516 an A-MPDU to STA2 104b, send 518 an A-MPDU to STA3 104c, and send 520 an A-MPDU to STA4 104d. The second set of A-MPDUs may also indicate a Block ACK response method to the receiving subscriber stations 104. Once the longest SDMA transmission of the second set of transmissions has completed, the access point 102 may end 522 the SDMA transmission. The access point 102 may then send 524 a Block ACK request to STA1 104a. The access point 102 may then receive 526 a Block ACK from STA1 104a. The BAR and corresponding BA may refer to both the first and second A-MPDU sent by the access point 102 to the subscriber stations 104. The access point 102 may next send 528 a Block ACK request to STA2 104b and then receive 530 a Block ACK from STA2 104b. The access point 104 may then send 532 a Block ACK request to STA3 104c and receive 534 a Block ACK from STA3 104c. Finally, the access point 102 may send 536 a Block ACK request to STA4 104d and then receive 538 a Block ACK from STA4 104d.

Figure 5A:
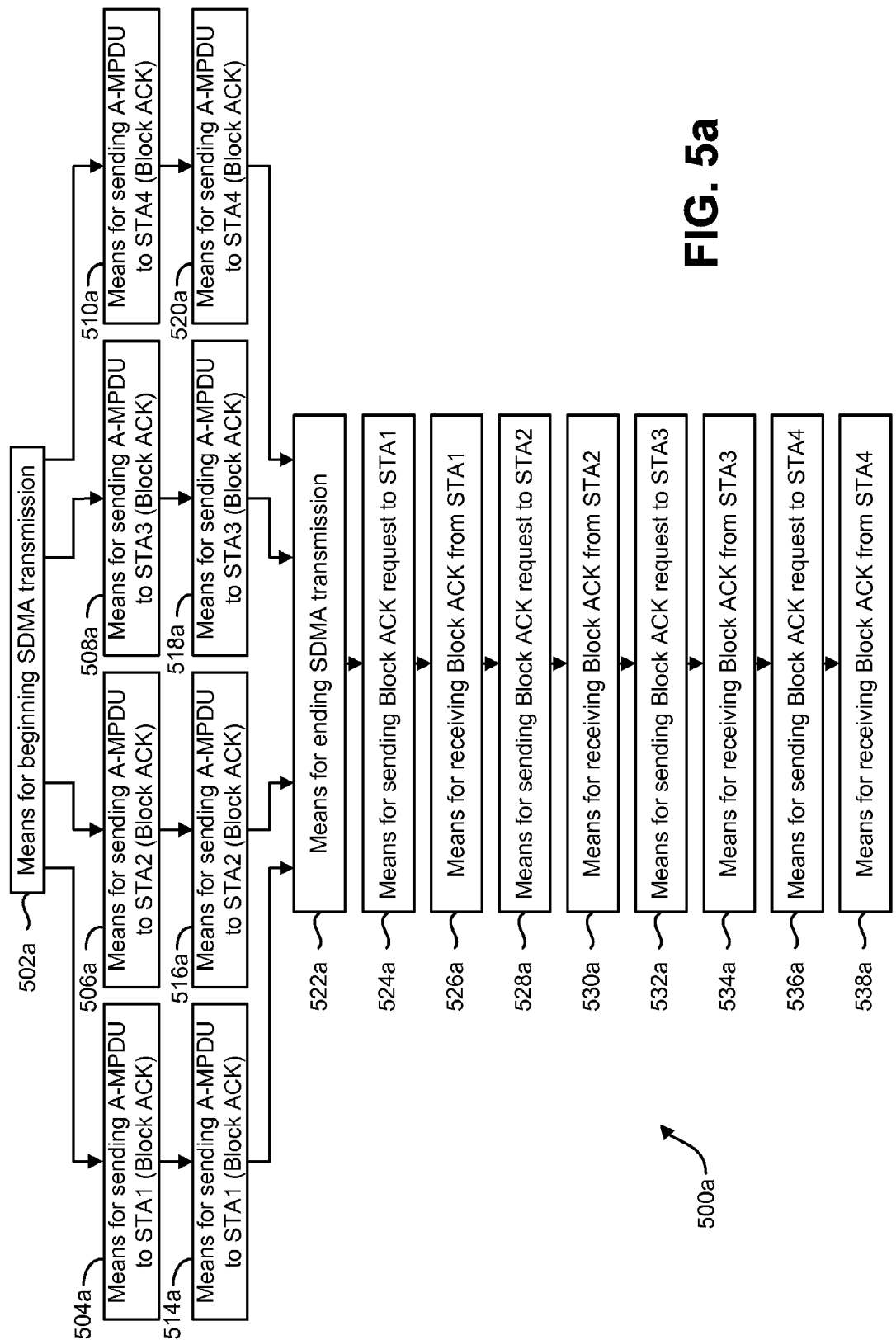
FIG. 5a illustrates means-plus-function blocks corresponding to the method of FIG. 5.

The method 500 of FIG. 5 described above may be performed by various hardware and/or software component(s) and/or module(s) corresponding to the means-plus-function blocks 500a illustrated in FIG. 5a. In other words, blocks 502 through 538 illustrated in FIG. 5 correspond to means-plus-function blocks 502a through 538a illustrated in FIG. 5a.

Figure 6:
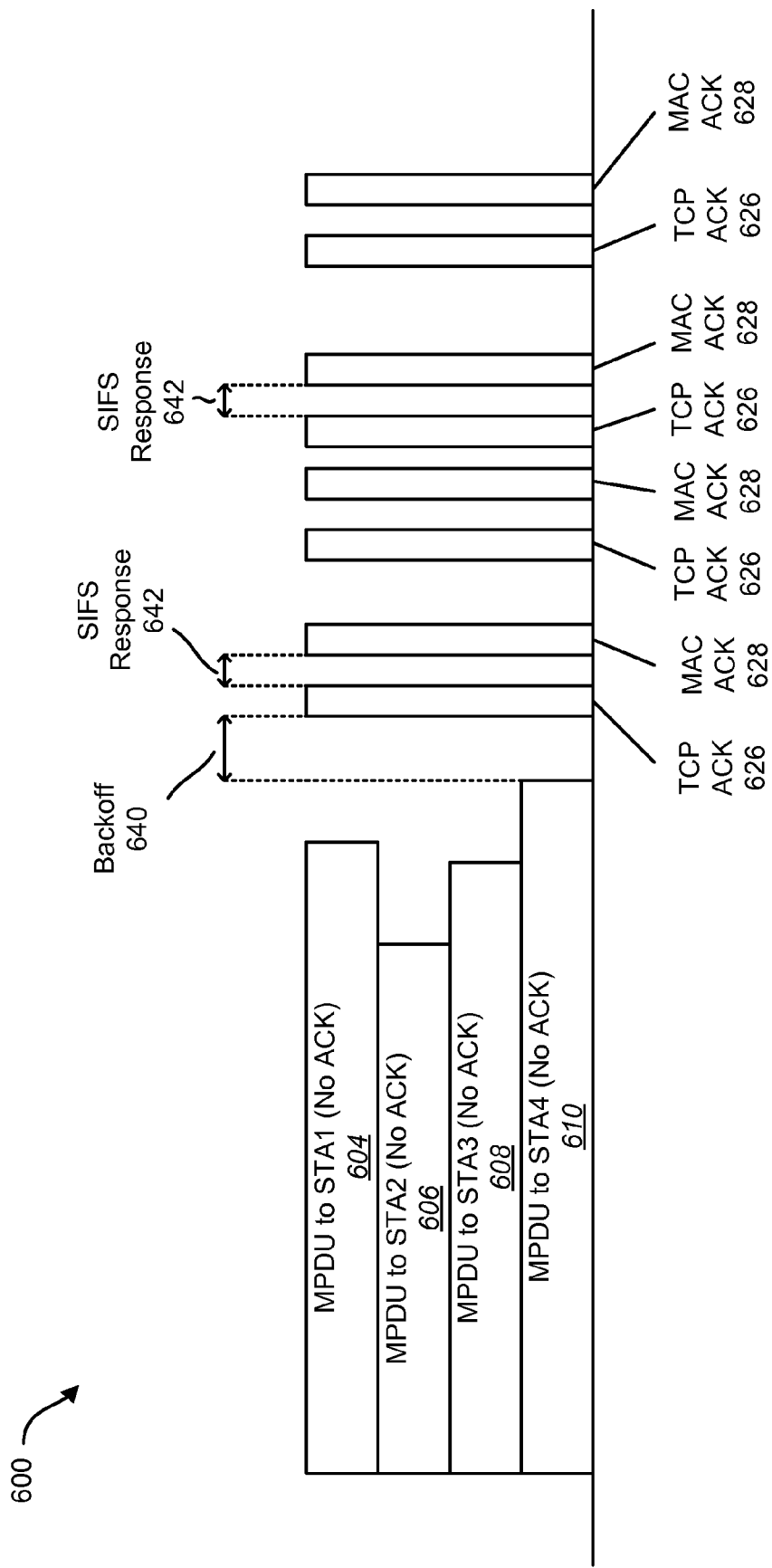
FIG. 6 illustrates a system for SDMA transmissions to multiple 802.11g receivers using a No ACK method of response.

FIG. 6 illustrates a system 600 for SDMA transmissions to multiple 802.11g receivers using a No ACK method of response. 802.11g receivers do not typically support a Block ACK policy. The access point 102 may instruct the 802.11g receivers to use the No ACK method of response when the access point 102 sends MPDUs 604, 606, 608, 610 to the 802.11g receivers. The 802.11g receivers need to be QoS capable (802.11e or Wi-Fi Multimedia (WMM)) in this case, because only then the ACK policy field is present in the MAC header. The ACK policy field is part of the QoS Control Field. The No ACK method of response may ensure that the legacy receivers do not transmit an ACK a SIFS after the end of the MPDU transmission. The No ACK method of response may also imply that there will be no MAC level ACK. Instead, the access point 102 may rely on the Transmission Control Protocol (TCP) ACK mechanism for packet loss to be detected and for lost packets to be retransmitted. After the longest SDMA MPDU transmission has completed, the receiving stations may sequentially transmit TCP ACK 626 transmissions to the access point 102 after a backoff 640 has elapsed. The access point 102 may wait a SIFS response 642 before transmitting a MAC ACK 628 in response to the TCP ACK 626.

The No ACK policy may also be used for SDMA transmissions to 802.11n stations instead of the Block ACK policy. The access point 102 may filter non-TCP packets and transmit these packets outside the SDMA transmissions.

Figure 7:
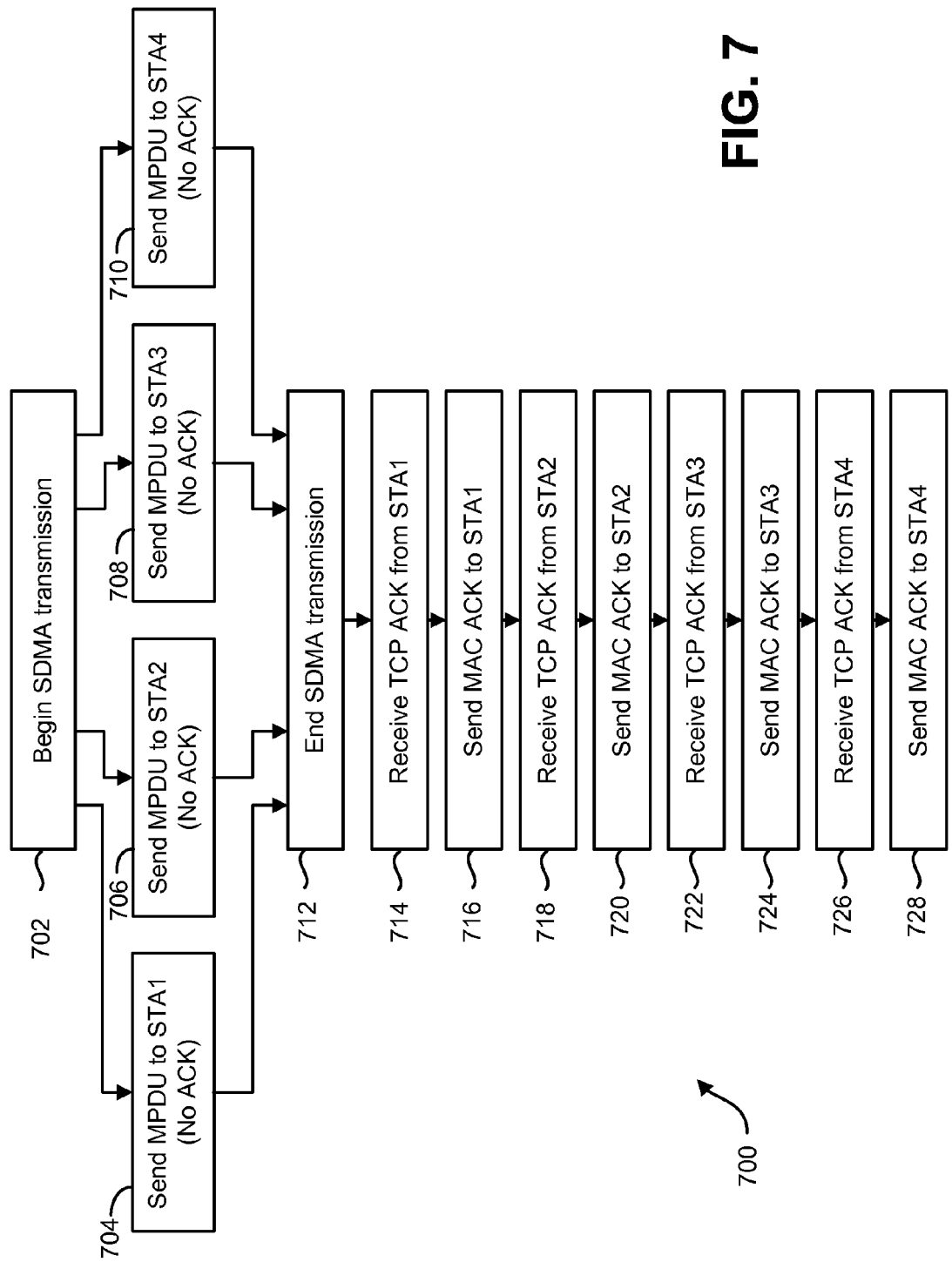
FIG. 7 is a flow diagram illustrating a method for SDMA transmission to multiple 802.11g receivers using a No ACK method of response.

FIG. 7 is a flow diagram illustrating a method 700 for SDMA transmission to multiple 802.11g receivers using a No ACK method of response. The access point 102 may begin 702 SDMA transmission. The SDMA transmission may indicate an ACK response method to the receiving subscriber stations 104. The access point 102 may send transmissions to the subscriber stations 104 in parallel. For example, the access point 102 may send 704 an MPDU to STA1 104a, send 706 an MPDU to STA2 104b, send 708 an MPDU to STA3 104c, and send 710 an MPDU to STA4 104d. The MPDUs may include instructions for the subscriber stations 104 to implement a No ACK method of response. Once the longest SDMA transmission has completed, the access point 102 may end 712 the SDMA transmission. The access point 102 may then receive 714 a TCP ACK 626 from STA1 104a. In response, the access point 102 may send 716 a MAC ACK 628 to STA1 104a. The access point 104 may next receive 718 a TCP ACK 626 from STA2 104b and then send 720 a MAC ACK 628 to STA2 104b. Next, the access point 102 may receive 722 a TCP ACK 626 from STA3 104c and send 724 a MAC ACK 628 to STA3 104c in response. Finally, the access point 102 may receive 726 a TCP ACK 626 from STA4 104d and the access point 102 may send 728 a MAC ACK 628 to STA4 104d in response.

The method 700 of FIG. 7 described above may be performed by various hardware and/or software component(s) and/or module(s) corresponding to the means-plus-function blocks 700a illustrated in FIG. 7a. In other words, blocks 702 through 728 illustrated in FIG. 7 correspond to means-plus-function blocks 702a through 728a illustrated in FIG. 7a.

Figure 8:
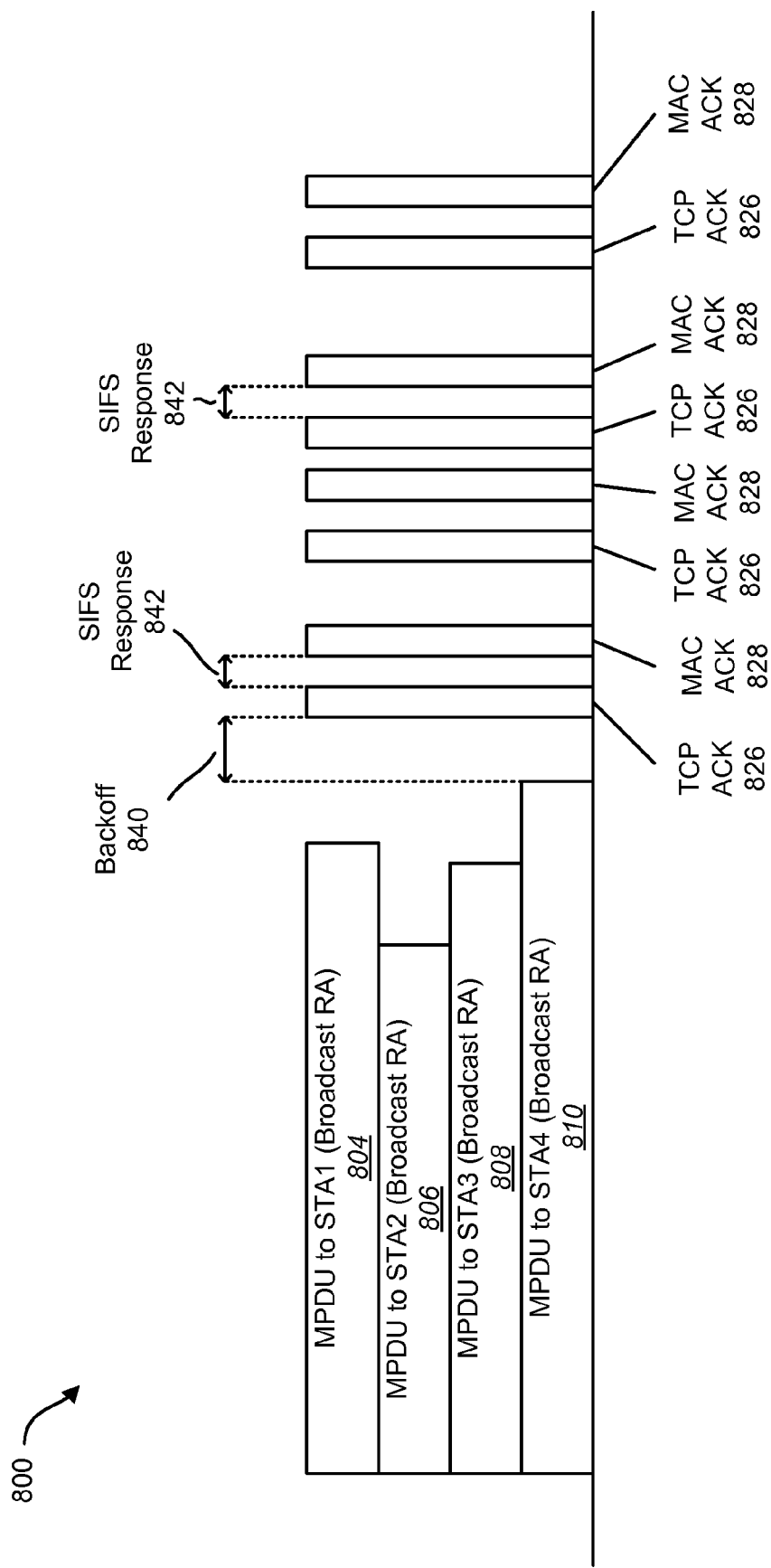
FIG. 8 illustrates a system for SDMA transmission to multiple 802.11 receivers using a broadcast Receiver Address (RA) policy.

FIG. 8 illustrates a system 800 for SDMA transmission to multiple 802.11 receivers using a broadcast Receiver Address (RA) policy. In a broadcast RA policy, the unicast MPDUs are transmitted to a group address. Thus, the unicast RA may be replaced with the broadcast address or a multicast address. In 802.11, when MPDUs are received with a group RA, the receiving subscriber station 104 does not send an acknowledgment, because the acknowledgments would collide if sent. The receiving subscriber station 104 may strip off the MAC header and transparently forward the packet contained in the frame. The packet may be an Internet protocol (IP) packet. Transmitting to the broadcast address may imply that there is no MAC ACK. The access point 102 may thus rely on the TCP acknowledgment and retransmission mechanism, similar to the No ACK method of response. The broadcast RA policy may also be applied to non QoS capable subscriber stations 104.

One potential drawback of using the broadcast address is that the group key is used for encryption, as opposed to the station key. This means that subscriber stations 104 may be able to decode transmissions for other subscriber stations 104. However, the use of the SDMA transmission makes it very unlikely that any subscriber station 104 other than the intended receiver would be able to correctly receive the transmission. Subscriber stations 104 addressed in the SDMA transmission may see a null for transmissions that are directed at other subscriber stations 104. Subscriber stations 104 that are not addressed in the SDMA transmission may see a collision for transmissions that are directed at other subscriber stations 104. A collision is likely to be un-decodable.

When the access point 102 relies on TCP ACK to determine whether a retransmission is necessary, the worst case latency of packet arrivals may be negatively impacted. In particular, this may occur for connections with a high end-to-end delay. If the frame error rate on the wireless connection becomes too high, the TCP throughput may drop off quickly. The access point 102 may decide to transmit packets outside the SDMA transmission for a connection with a high end-to-end delay.

The access point 102 may transmit MPDUs 804, 806, 808, 810 to the subscriber stations 104. The MPDUs include a broadcast RA. Once the longest SDMA transmission has completed, the subscriber stations 104 may sequentially transmit TCP ACK 826 transmissions to the access point 102 after a backoff 840 has elapsed. The access point 102 may wait a SIFS response 842 after receiving a TCP ACK 826 before transmitting a MAC ACK 828 to the subscriber station 104. This process may continue until all of the subscriber stations 104 that have received MPDUs have been acknowledged.

Figure 9:
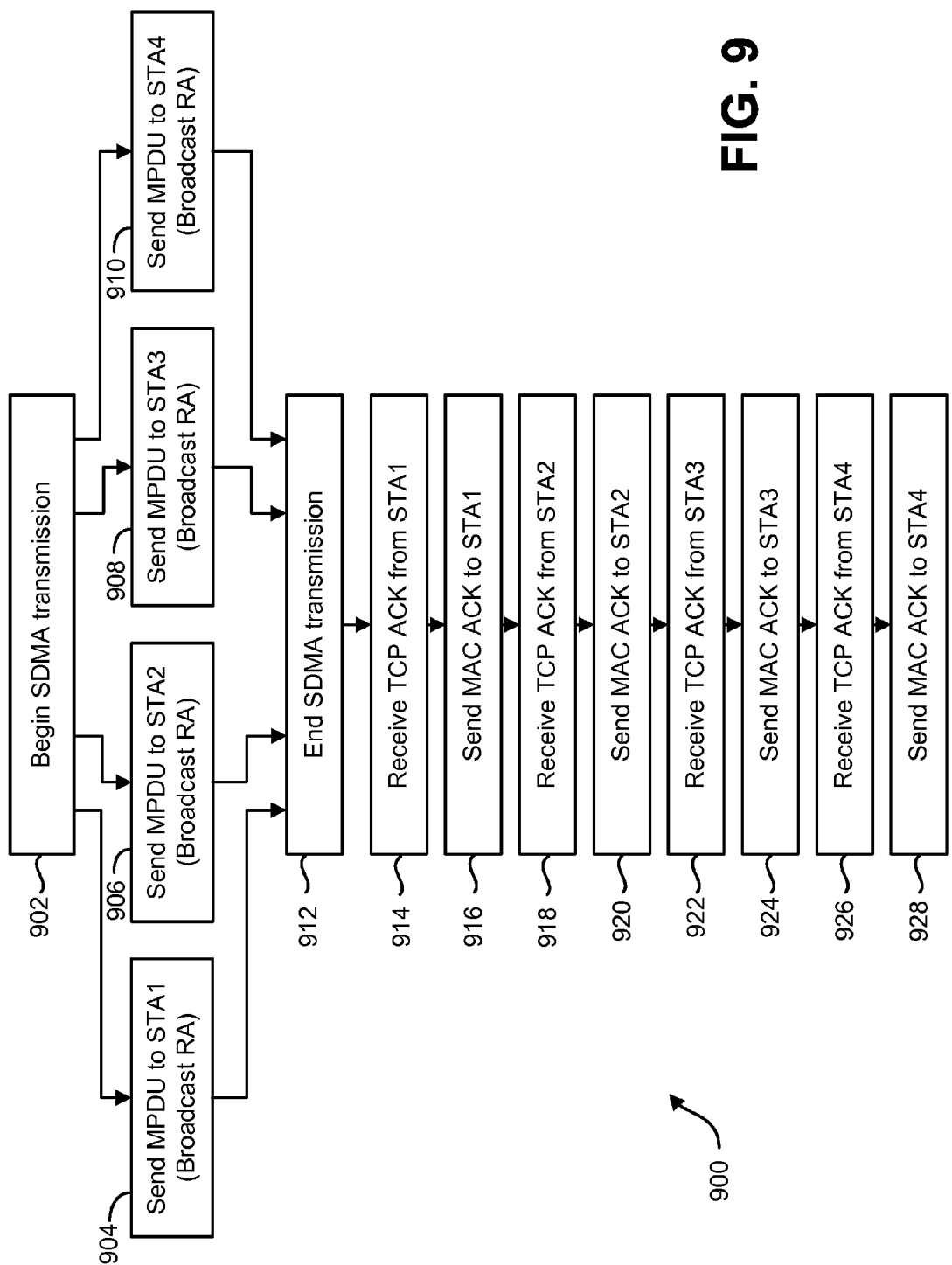
FIG. 9 is a flow diagram illustrating a method for SDMA transmission to multiple 802.11 receivers using a broadcast RA policy.

FIG. 9 is a flow diagram illustrating a method 900 for SDMA transmission to multiple 802.11 receivers using a broadcast RA policy. The access point 102 may begin 902 SDMA transmission. The access point 102 may send transmissions to the subscriber stations 104 in parallel. For example, the access point 102 may send 904 an MPDU to STA1 104a, send 906 an MPDU to STA2 104b, send 908 an MPDU to STA3 104c, and send 910 an MPDU to STA4 104d. Once the longest SDMA transmission has completed, the access point 102 may end 912 the SDMA transmission. The access point 102 may then receive 914 a TCP ACK 826 from STA1 104a. In response, the access point 102 may send 916 a MAC ACK 828 to STA1 104a. The access point 102 may next receive 918 a TCP ACK 826 from STA2 104b and then send 920 a MAC ACK 828 to STA2 104b. Next, the access point 102 may receive 922 a TCP ACK 826 from STA3 104c and send 924 a MAC ACK 828 to STA3 104c in response. Finally, the access point 102 may receive 926 a TCP ACK 826 from STA4 104d and the access point 102 may send 928 a MAC ACK 828 to STA4 104d in response.

Figure 9A:
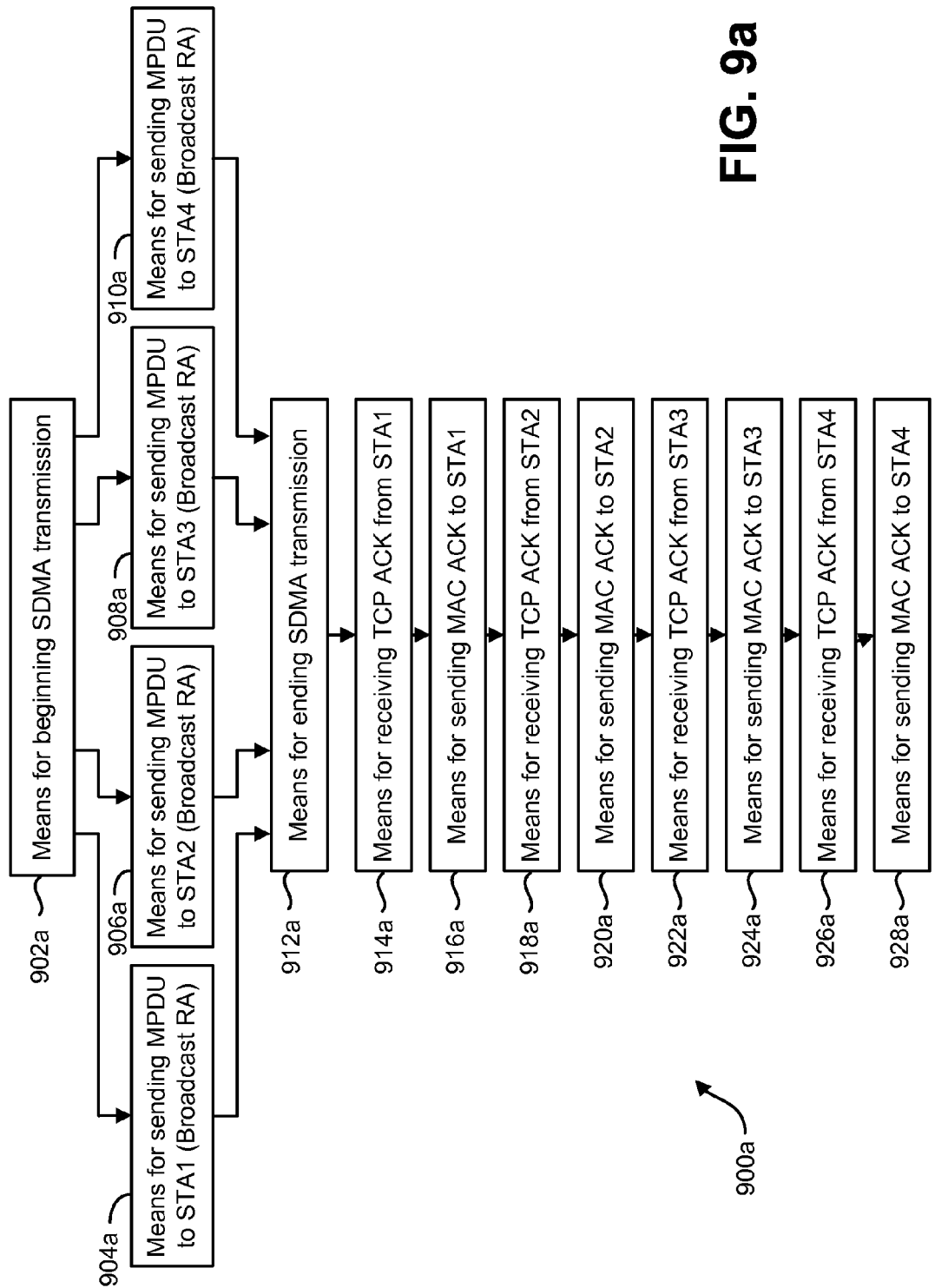
FIG. 9a illustrates means-plus-function blocks corresponding to the method of FIG. 9.

The method 900 of FIG. 9 described above may be performed by various hardware and/or software component(s) and/or module(s) corresponding to the means-plus-function blocks 900a illustrated in FIG. 9a. In other words, blocks 902 through 928 illustrated in FIG. 9 correspond to means-plus-function blocks 902a through 928a illustrated in FIG. 9a.

Figure 10:
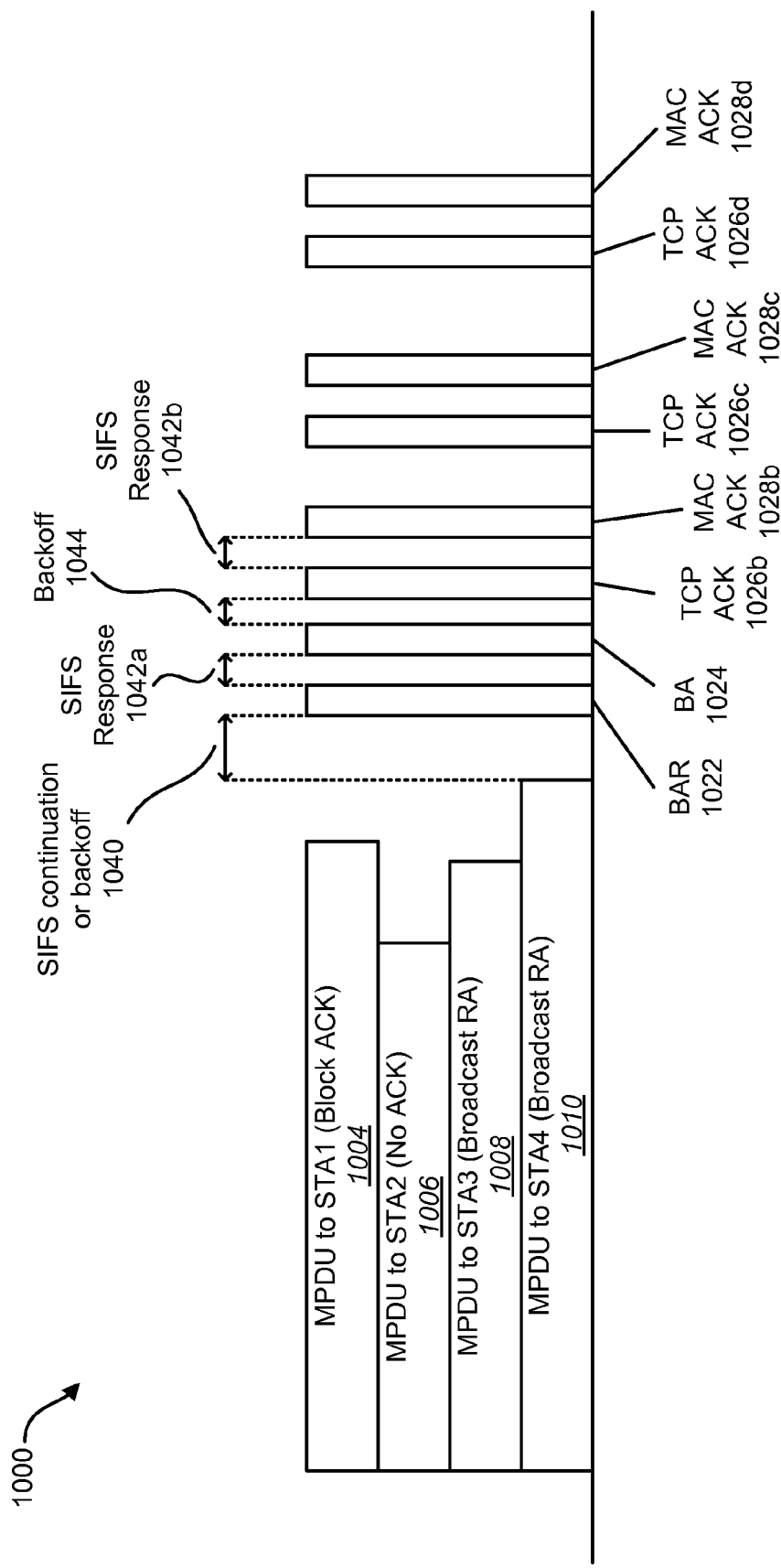
FIG. 10 illustrates a system for SDMA transmission to multiple 802.11 receivers using a mix of the immediate ACK avoiding methods of response including the Block ACK method, the No ACK method, and the broadcast RA policy.

FIG. 10 illustrates a system 1000 for SDMA transmission to multiple receivers using a mix of the immediate ACK avoiding methods of response including the Block ACK method, the No ACK method, and the broadcast RA policy. The access point 102 may transmit MPDUs in parallel to the receiving subscriber stations 104 using SDMA transmission. Each of the MPDUs may include instructions in the QC field of the MAC header for a method of acknowledgment by the receiver of the MPDU. For example, the access point 102 may transmit a MPDU 1004 to STA1 104a that includes instructions for STA1 104a to employ the Block ACK method. The access point 102 may transmit an MPDU 1006 to STA2 104b that includes instructions for STA2 104b to employ the No ACK method. The access point 102 may also transmit an MPDU 1008 to STA3 104c that includes instructions for STA3 104c to employ the broadcast RA policy. The access point 102 may further transmit an MPDU 1010 to STA4 104d that includes instructions for STA4 104d to employ the broadcast RA policy.

Each of the MPDU transmissions in the SDMA transmission block may be of different lengths. Once the longest MPDU transmission has completed, the access point 102 may wait for a SIFS continuation 1040 or for a backoff. Each of the above mentioned acknowledgment methods may then occur in turn. In this case, the acknowledgment for STA1 104a may occur first. Thus, the access point 102 may transmit a BAR 1022 to STA1 104a. After a SIFS response 1042a, STA1 104a may transmit a BA 1024 to the access point 102. A backoff 1044 may then occur. Following the backoff 1044, STA2 104b may transmit a TCP ACK 1026b to the access point 102. The access point 102 may wait for a SIFS response 1042b before sending a MAC ACK 1028b to STA2 104b.

The access point 102 may then receive a TCP ACK 1026c from STA3 104c. Upon receiving the TCP ACK 1026c from STA3 104c, the access point 102 may send a MAC ACK 1028c to STA3 104c. Finally, the access point 102 may receive a TCP ACK 1026d from STA4 104d. The access point 102 may then send a MAC ACK 1028d to STA4 104d.

Figure 11:
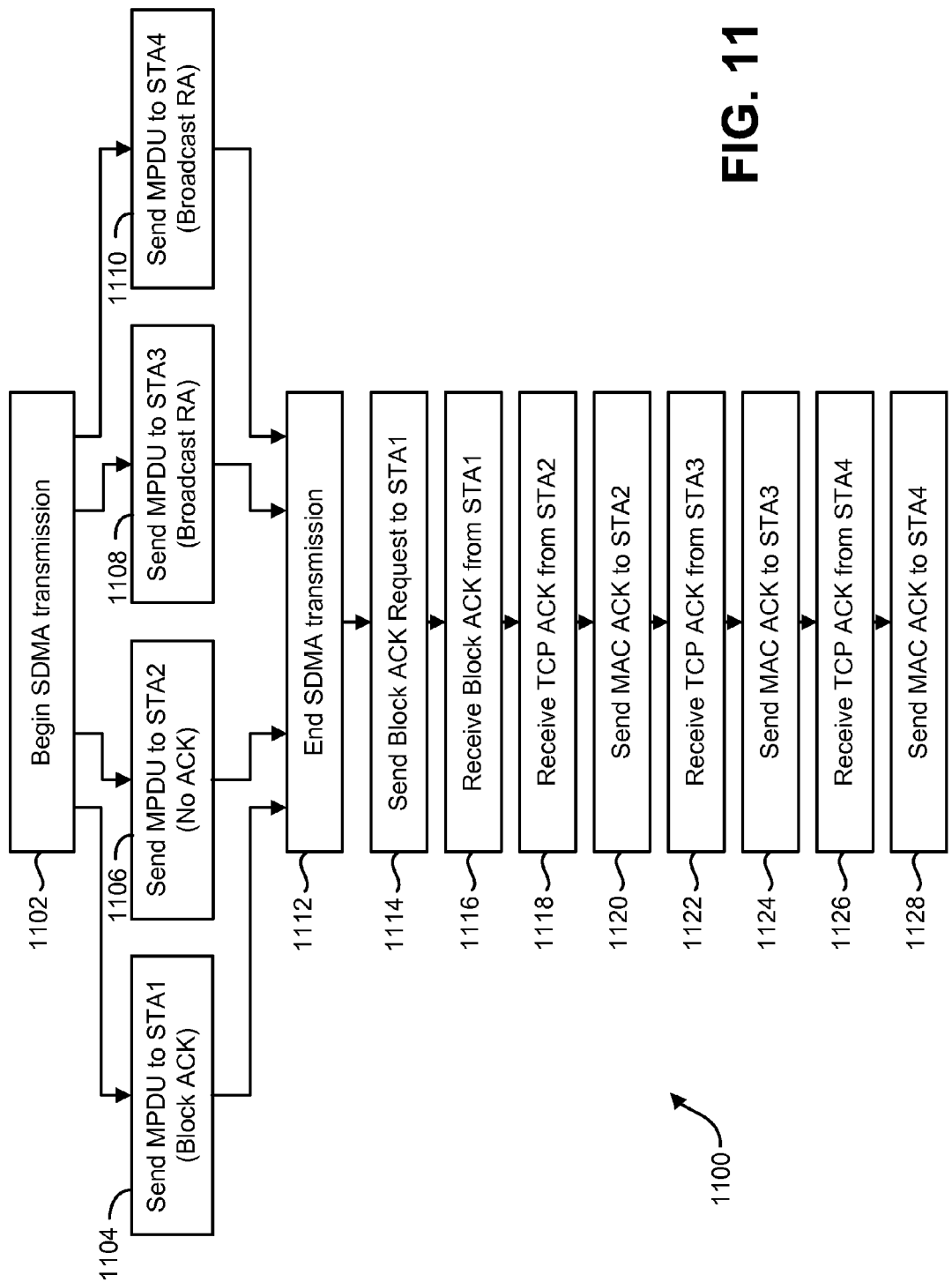
FIG. 11 is a flow diagram illustrating a method for SDMA transmission to multiple 802.11 receivers using a mix of immediate ACK avoiding methods.

FIG. 11 is a flow diagram illustrating a method 1100 for SDMA transmission to multiple 802.11 receivers using a mix of immediate ACK avoiding methods. The access point 102 may begin 1102 SDMA transmission. The SDMA transmission may indicate an immediate ACK avoiding method to each of the receiving subscriber stations 104. The immediate ACK avoiding method may be indicated by the values of the ACK policy subfield in the QC field of each MPDU. The access point 102 may send transmissions to the subscriber stations 104 in parallel. For example, the access point 104 may send 1104 an MPDU to STA1 104a. The MPDU sent to STA1 104a may include values of the ACK policy subfield that indicate to STA1 104a to follow the Block ACK method. Thus, in the ACK policy subfield, QC bit 5 may be set to 1 and QC bit 6 may be set to 1. The access point 102 may send 1106 an MPDU to STA2 104b. The MPDU sent to STA2 104b may include values of the ACK policy subfield that indicate to STA2 104b to follow the No ACK method. Thus, in the ACK policy subfield, QC bit 5 may be set to 1 and QC bit 6 may be set to 0.

The access point 102 may send 1108 an MPDU to STA3 104c and send 1110 an MPDU to STA4 104d. The MPDU sent to STA3 104c and the MPDU sent to STA4 104d may include a broadcast RA. As discussed above in relation to FIG. 8, MPDUs that include a broadcast RA do not signal the receiving subscriber station 104 to send an ACK to the access point 102 upon reception.

Once the longest SDMA transmission has completed, the access point 102 may end 1112 the SDMA transmission. The access point 102 may then send 1114 a Block ACK request 1022 to STA1 104a. In response, the access point 102 may receive 1116 a Block ACK 1024 from STA1 104a. The access point 102 may next receive 1118 a TCP ACK 1026b from STA2 104b and then send 1120 a MAC ACK 1028b to STA2 104b. Next, the access point 102 may receive 1122 a TCP ACK 1026c from STA3 104c and send 1124 a MAC ACK 1028c to STA3 104c in response. Finally, the access point 104 may receive 1126 a TCP ACK 1026d from STA4 104d and the access point 102 may send 1128 a MAC ACK 1028d to STA4 104d in response.

Figure 11A:
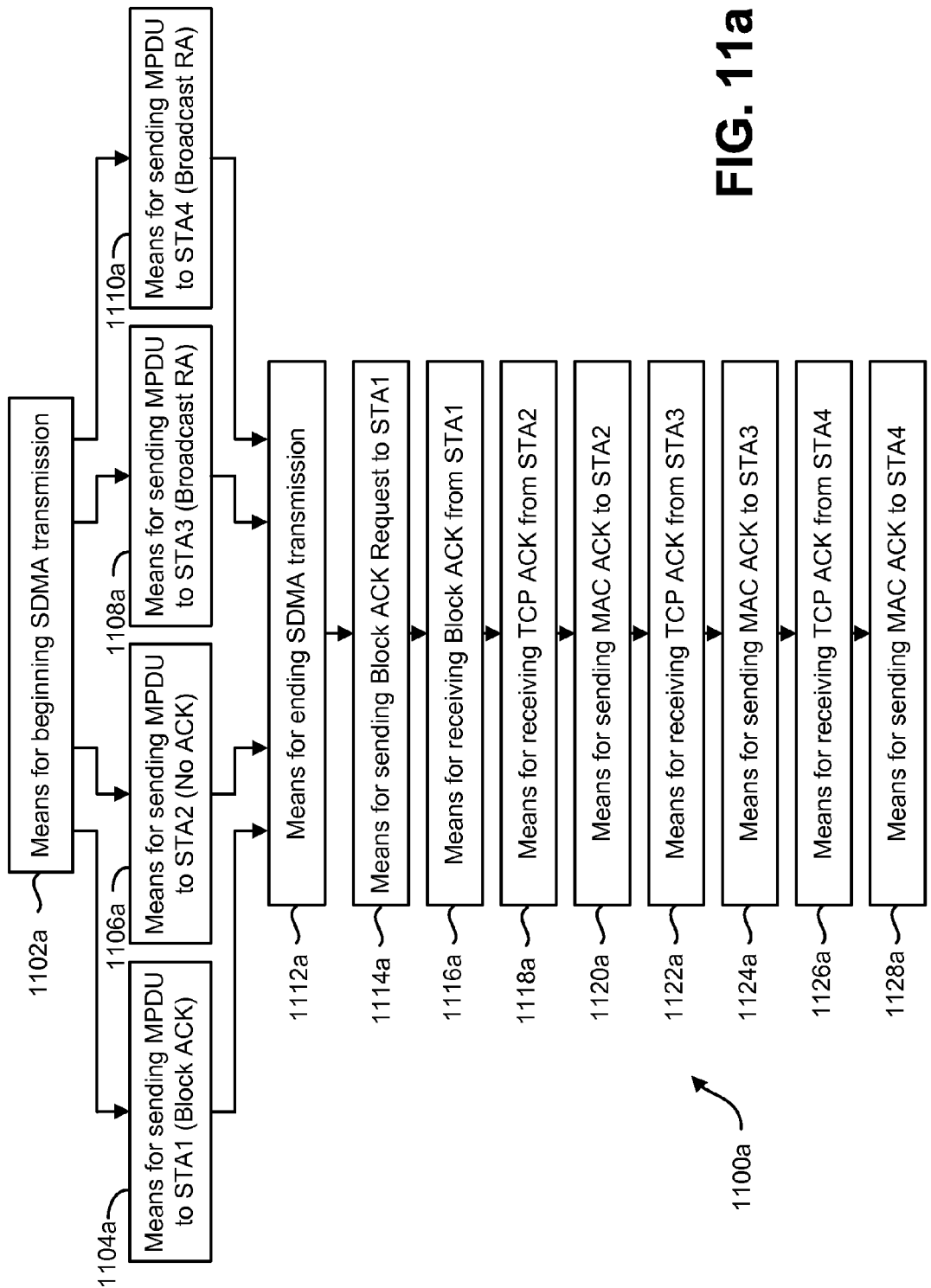
FIG. 11a illustrates means-plus-function blocks corresponding to the method of FIG. 11.

The method 1100 of FIG. 11 described above may be performed by various hardware and/or software component(s) and/or module(s) corresponding to the means-plus-function blocks 1100a illustrated in FIG. 11a. In other words, blocks 1102 through 1128 illustrated in FIG. 11 correspond to means-plus-function blocks 1102a through 1128a illustrated in FIG. 11a.

Figure 12:
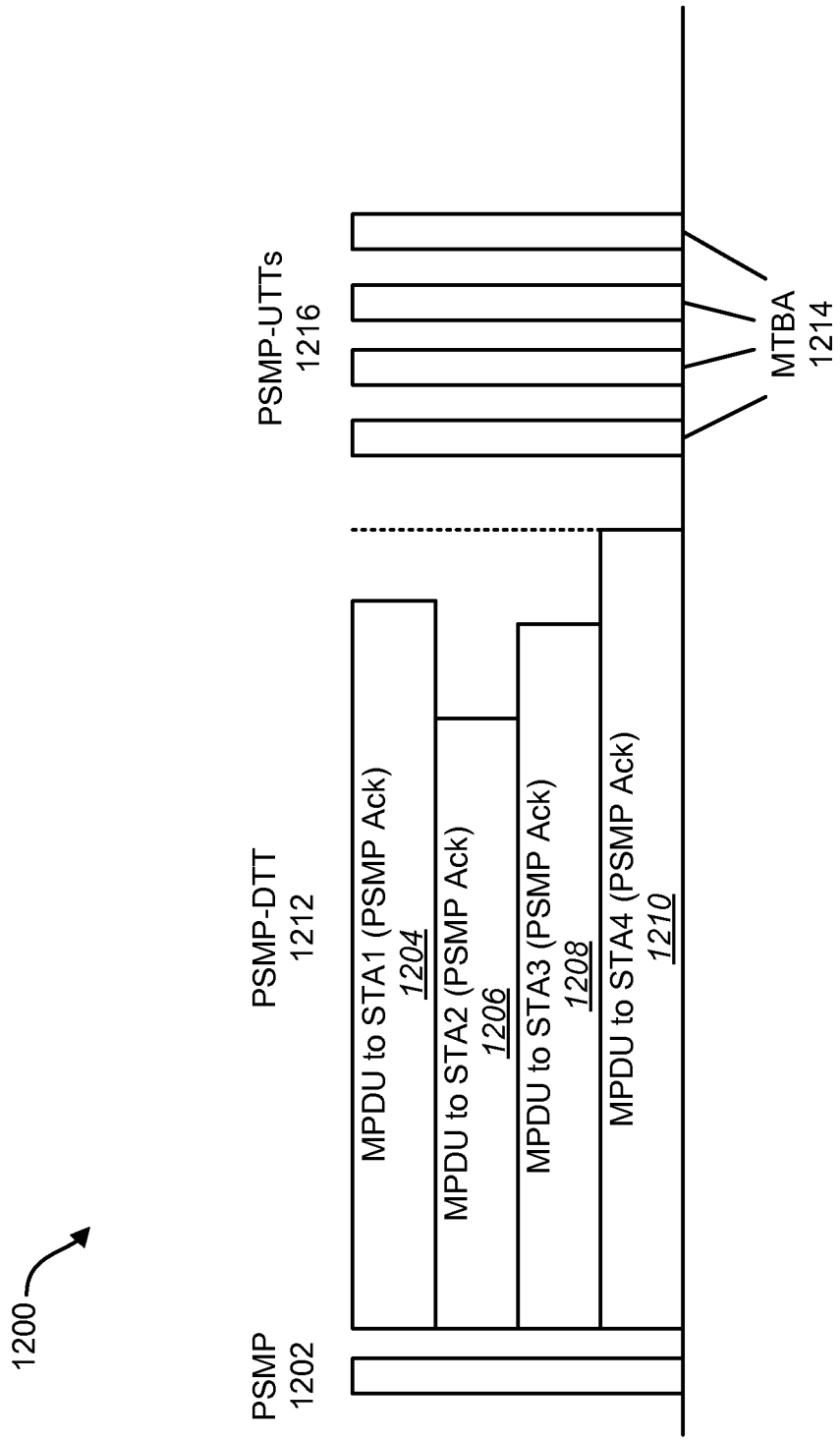
FIG. 12 illustrates a system for SDMA transmission to multiple legacy receivers that support Power Save Multi-Poll (PSMP)

FIG. 12 illustrates a system 1200 for SDMA transmission to multiple receivers that support Power Save Multi-Poll (PSMP). The receivers may be legacy receivers or VHT receivers. In PSMP, data may be transmitted to multiple subscriber stations 104 with a single announcement frame. The access point 102 may announce the schedule of an upcoming Power Save Multi-Poll Downlink Transmission Time (PSMP-DTT) 1212 and Power Save Multi-Poll Uplink Transmission Times (PSMP-UTTs) 1216 in a PSMP frame 1202. This method may be referred to as a PSMP ACK method. Thus, the PSMP-DTT 1212 and the PSMP-UTTs 1216 are separate by default. The PSMP-DTT 1212 indicates the downlink time during which the receiving subscriber station 104 needs to be awake. The PSMP-UTT 1216 indicates the uplink time during which the acknowledgment information can be sent by the receiver subscriber station 104 to the access point 102.

The access point 102 may transmit a PSMP frame 1202. The PSMP frame 1202 may be transmitted to all the subscriber stations 104 that are in electronic communication with the access point 102. Alternatively, the PSMP frame 1202 may only be sent to the subscriber stations 104 that support PSMP. The PSMP-DTT 1212 may then begin. The access point 102 may transmit MPDUs in parallel to the receiving subscriber stations 104 using SDMA transmission. Each of the MPDUs may include instructions in the QC field of the MAC header for a method of acknowledgment by the receiver of the MPDU. For example, the access point 102 may transmit an MPDU 1204 to STA1 104a that includes instructions for STA1 104a to employ the PSMP ACK method. The access point 102 may also transmit MPDUs 1206, 1208, 1210 to STA2 104b, STA3 104c, and STA4 104d respectively, that include instructions for STA2 104b, STA3 104c, and STA4 104d to employ the PSMP ACK method.

Each of the MPDU transmissions in the PSMP-DTT 1212 may be of different lengths. Once the longest MPDU transmission has completed, the access point 102 may wait until the PSMP-UTTs 1216 have begun. During the PSMP-UTTs 1216, the subscriber stations 104 that have received an MPDU from the access point 102 may transmit Multi Traffic Identifier Block Acknowledgments (MTBA) 1214 to the access point 102. A delay time period may occur between each of the MTBAs 1214.

Figure 13:
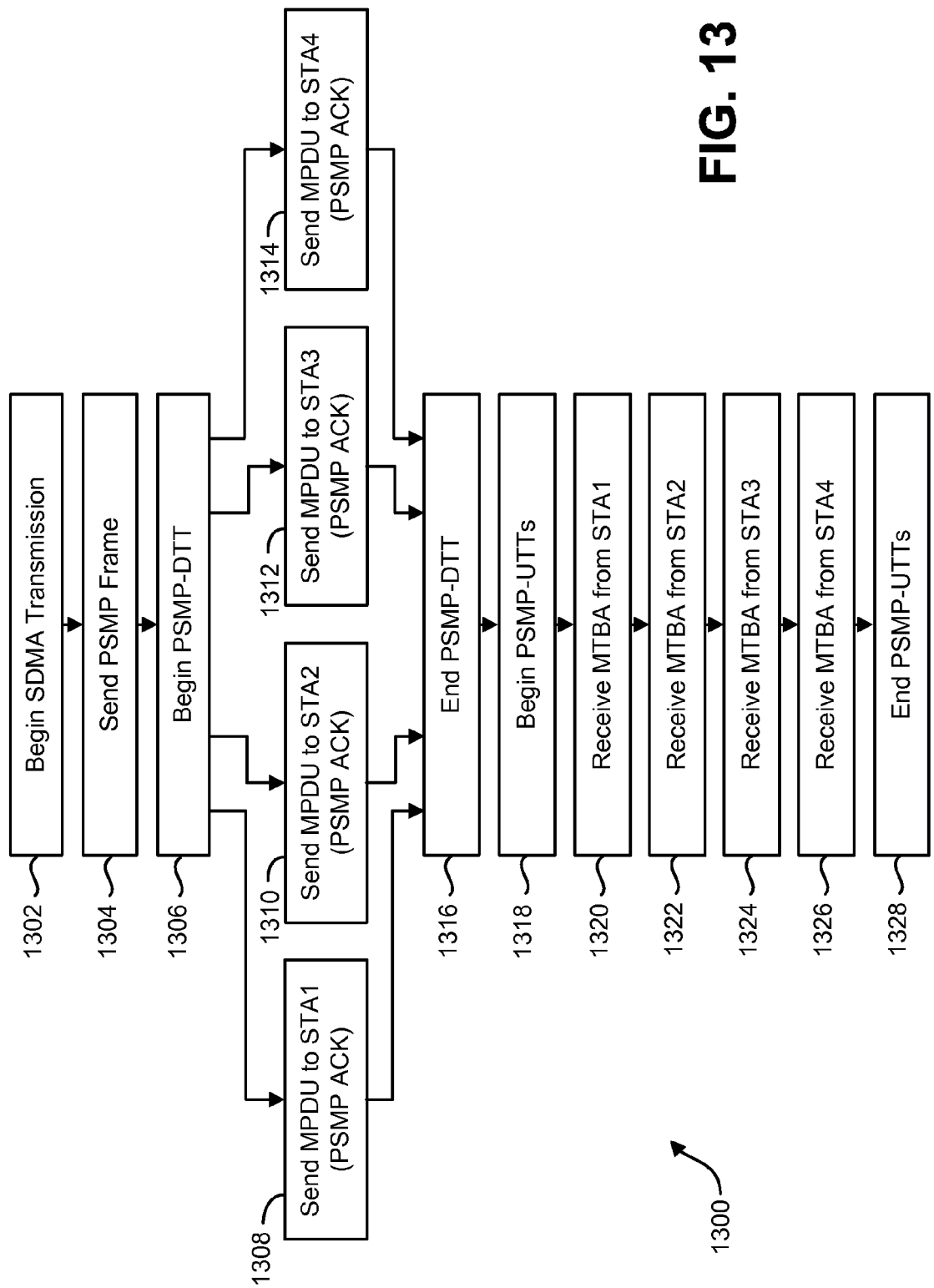
FIG. 13 is a flow diagram illustrating a method for SDMA transmission to multiple 802.11n receivers using PSMP.

FIG. 13 is a flow diagram illustrating a method 1300 for SDMA transmission to multiple 802.11n receivers using PSMP. The access point 102 may begin 1302 SDMA transmission. The access point 102 may send 1304 a PSMP Frame 1202 to the subscriber stations 104. The PSMP Frame 1202 may indicate the PSMP-DTT 1212 and PSMP-UTTs 1216 to the subscriber stations 104. The access point 102 may then begin 1306 the PSMP-DTT 1212. During the PSMP-DTT 1212, the access point 102 may send MPDUs in parallel to the subscriber stations 104. The MPDUs may indicate the immediate ACK avoiding method by the values of the ACK policy subfield in the QC field of each MPDU. As discussed above, if QC bit 5 is set to 0 and QC bit 6 is set to 1, the subscriber station 104 is instructed to use the PSMP ACK method.

The access point 102 may then send 1308 an MPDU 1204 to STA1 104a, send 1310 an MPDU 1206 to STA2 104b, send 1312 an MPDU 1208 to STA3 104c, and send 1314 an MPDU 1210 to STA4 104d. Once the longest SDMA transmission has completed, the access point 102 may end 1316 the PSMP-DTT 1212 and begin 1318 the PSMP-UTTs 1216. The access point 102 may then receive 1320 an MTBA 1214 from STA1 104a. The access point 102 may next receive 1322 an MTBA 1214 from STA2 104b and then receive 1324 an MTBA 1214 from STA3 104c. Finally, the access point 102 may receive 1326 an MTBA 1214 from STA4 104d. The access point 102 may then end 1328 the PSMP-UTTs 1216.

Figure 13A:
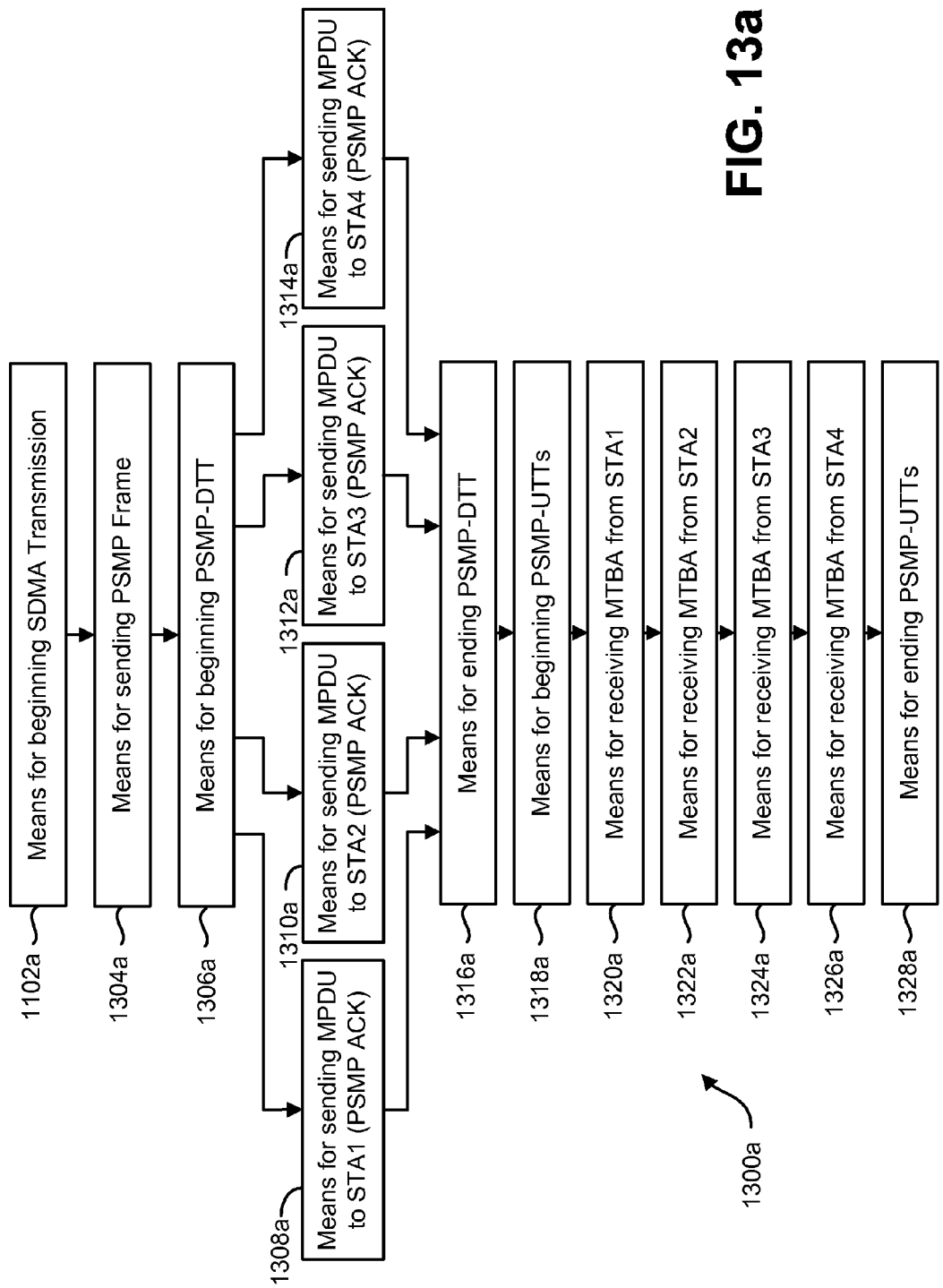
FIG. 13a illustrates means-plus-function blocks corresponding to the method of FIG. 13.

The method 1300 of FIG. 13 described above may be performed by various hardware and/or software component(s) and/or module(s) corresponding to the means-plus-function blocks 1300a illustrated in FIG. 13a. In other words, blocks 1302 through 1328 illustrated in FIG. 13 correspond to means-plus-function blocks 1302a through 1328a illustrated in FIG. 13a.

Figure 14:
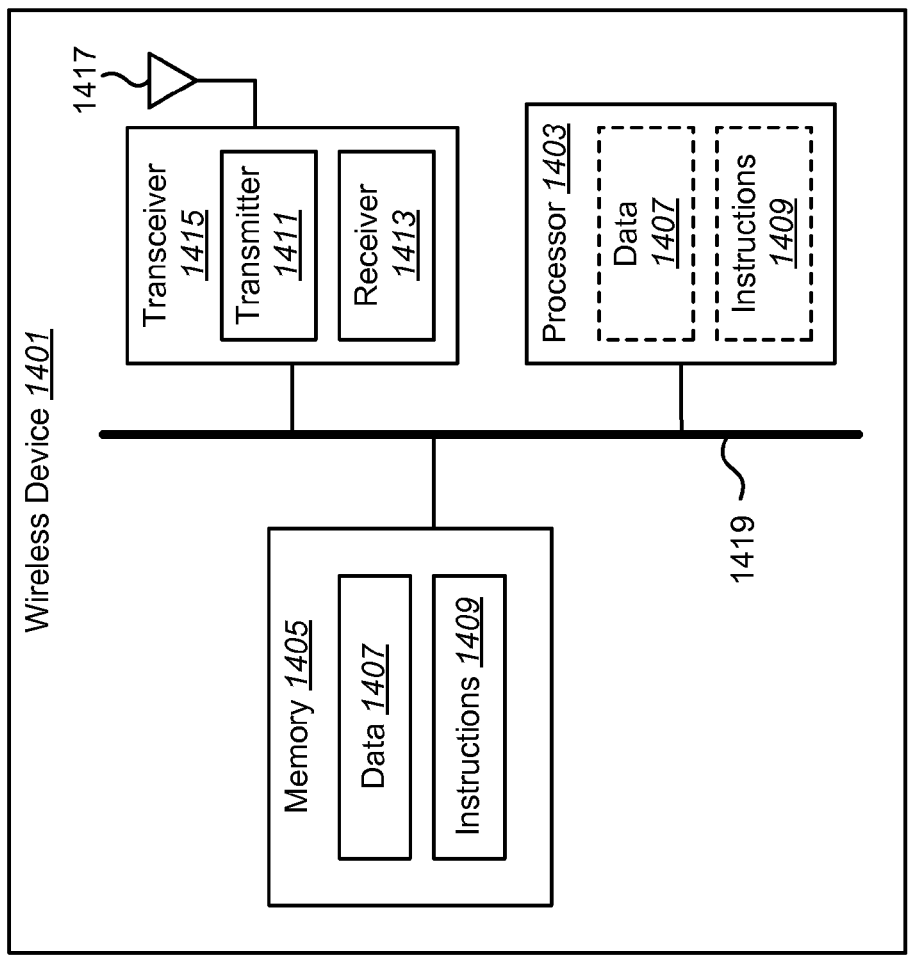
FIG. 14 illustrates various components that may be utilized in a wireless device.

FIG. 14 illustrates certain components that may be included within a wireless device 1401. The wireless device 1401 may be a subscriber station 104 or an access point 102.

The wireless device 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless device 1401 of FIG. 14, in an alternative configuration, a combination of processors (e.g., an ARM and DSP) could be used.

The wireless device 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405.

The wireless device 1401 may also include a transmitter 1411 and a receiver 1413 to allow transmission and reception of signals between the wireless device 1401 and a remote location. The transmitter 1411 and receiver 1413 may be collectively referred to as a transceiver 1415. An antenna 1417 may be electrically coupled to the transceiver 1415. The wireless device 1401 may also include (not shown) multiple transmitters, multiple receivers, multiple transceivers and/or multiple antenna.

The various components of the wireless device 1401 may be coupled together by one or more buses, which may include a power bus, a control signal bus, a status signal bus, a data bus, etc. For the sake of clarity, the various buses are illustrated in FIG. 14 as a bus system 1419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for parallel communication with wireless local area network (WLAN) receivers, the method being implemented by a wireless device, the method comprising:

sending a first medium access control (MAC) protocol data unit (MPDU) to a first WLAN receiver;

sending a second MPDU to a second WLAN receiver in parallel to the first MPDU; and including, in a MAC header of the first MPDU, instructions to the first WLAN receiver that comprise an acknowledgement policy for the first WLAN receiver.

2. The method of claim 1, wherein the parallel communication comprises spatial division multiple access (SDMA).

3. The method of claim 1, wherein the parallel communication comprises orthogonal frequency division multiple access (OFDMA).

4. The method of claim 1, wherein the MPDU includes instructions for the first WLAN receiver that comprise a Block ACK method, and wherein the method further comprises:

receiving an ACK from the first WLAN receiver.

5. The method of claim 1, wherein the MPDU includes instructions for the first WLAN receiver that comprise a No ACK method.

6. The method of claim 1, wherein the MPDU includes instructions for the first WLAN receiver that comprise a Broadcast Receiver Address (RA) policy.

7. The method of claim 1, wherein the MPDU includes instructions for the first WLAN receiver that comprise a Power Save Multi-Poll (PSMP) policy.

8. The method of claim 4, wherein the ACK request sent to the first WLAN receiver is a Block Acknowledgment Request.

9. The method of claim 4, wherein the ACK request sent to the first WLAN receiver is a Block ACK Request (BAR) frame.

10. The method of claim 4, wherein the ACK received from the first WLAN receiver is a block ACK.

11. The method of claim 4, wherein the ACK received from the first WLAN receiver is a transmission control protocol (TCP) ACK.

12. The method of claim 11, further comprising sending a MAC ACK upon receiving the TCP ACK from the first WLAN receiver.

13. The method of claim 1, wherein the method is implemented in a wireless communication system that supports an Institute of Electronic and Electrical Engineers (IEEE) 802.11 standard that uses Very High Throughput (VHT).

14. The method of claim 1, wherein the first WLAN receiver comprises a legacy WLAN receiver.

15. A wireless device that is configured for parallel communication with wireless local area network (WLAN) receivers, comprising:

a processor; and circuitry coupled to said processor configured to:

send a first medium access control (MAC) protocol data unit (MPDU) to a first WLAN receiver;

send a second MPDU to a second WLAN receiver in parallel to the first MPDU; and include, in a MAC header of the first MPDU, instructions to the first WLAN receiver that comprise an acknowledgement policy for the first WLAN receiver.

16. The wireless device of claim 15, wherein the parallel communication comprises spatial division multiple access (SDMA).

17. The wireless device of claim 15, wherein the parallel communication comprises orthogonal frequency division multiple access (OFDMA).

18. The wireless device of claim 15, wherein the MPDU includes instructions for the first WLAN receiver that comprise a Block ACK method, and wherein the circuitry is further configured to:

receive an ACK from the first WLAN receiver.

19. The wireless device of claim 15, wherein the MPDU includes instructions for the first WLAN receiver that comprise a No ACK method.

20. The wireless device of claim 15, wherein the MPDU includes instructions for the first WLAN receiver that comprise a Broadcast Receiver Address (RA) policy.

21. The wireless device of claim 15, wherein the MPDU includes instructions for the first WLAN receiver that comprise a Power Save Multi-Poll (PSMP) policy.

22. The wireless device of claim 18, wherein the ACK request sent to the first WLAN receiver is a Block Acknowledgment Request.

23. The wireless device of claim 18, wherein the ACK request sent to the first WLAN receiver is a Block ACK Request (BAR) frame.

24. The wireless device of claim 18, wherein the ACK received from the first WLAN receiver is a block ACK.

25. The wireless device of claim 18, wherein the ACK received from the first WLAN receiver is a transmission control protocol (TCP) ACK.

26. The wireless device of claim 25, wherein the circuitry is further configured to send a MAC ACK upon receiving the TCP ACK from the first WLAN receiver.

27. The wireless device of claim 15, wherein the wireless device is configured to support an Institute of Electronic and Electrical Engineers (IEEE) 802.11 standard that uses Very High Throughput (VHT).

28. The wireless device of claim 15, wherein the first WLAN receiver comprises a legacy WLAN receiver.

29. An apparatus that is configured for spatial division multiple access (SDMA) communication with wireless local area network (WLAN) receivers, comprising:

means for sending a first medium access control (MAC) protocol data unit (MPDU) to a first WLAN receiver, wherein a MAC header of the MPDU comprises a method of acknowledgment for the first WLAN receiver;

means for sending a second MPDU to a second WLAN receiver in parallel to the first MPDU;

means for sending an acknowledgment (ACK) request to the first WLAN receiver; and means for receiving an ACK from the first WLAN receiver.

30. A computer-program product for spatial division multiple access (SDMA) communication with wireless local area network (WLAN) receivers, the computer-program product comprising a non-transitory computer-readable medium having instructions thereon, the instructions comprising:

code for sending a first medium access control (MAC) protocol data unit (MPDU) to a first WLAN receiver, wherein a MAC header of the MPDU comprises a method of acknowledgment for the first WLAN receiver;

code for sending a second MPDU to a second WLAN receiver in parallel to the first MPDU;

code for sending an acknowledgment (ACK) request to the first WLAN receiver; and code for receiving an ACK from the first WLAN receiver.

31. A method for parallel communication with wireless local area network (WLAN) receivers, the method comprising:

sending a Power Save Multi-Poll (PSMP) frame indicating a Power Save Multi-Poll Downlink Transmission Time (PSMP-DTT) and a Power Save Multi-Poll Uplink Transmission Time (PSMP-UTT);

sending a first MAC protocol data unit (MPDU) to a first WLAN receiver indicating a PSMP acknowledgement (ACK) policy, wherein the PMSP ACK policy is indicated in a MAC header of the MPDU;

sending a second MPDU to a second WLAN receiver in parallel to the first MPDU; and receiving a Multicast Traffic Identifier Block ACK (MTBA) frame from the first WLAN receiver during the PSMP-UTT.

* * * * *